(12) United States Patent
Blacket et al.

(10) Patent No.: US 10,406,592 B2
(45) Date of Patent: Sep. 10, 2019

(54) METHOD OF RIVETING

(71) Applicant: Henrob Limited, Fintshire (GB)

(72) Inventors: Stuart Edmund Blacket, Queensland (AU); Wojciech Gostylla, Queensland (AU); Paul Briskham, Coventry (GB)

(73) Assignee: Atlas Copco IAS UK Limited, Flintshire (GB)

( * ) Notice: Subject to any disclaimer, the term of this patent is extended or adjusted under 35 U.S.C. 154(b) by 163 days.

(21) Appl. No.: 15/112,413

(22) PCT Filed: Jan. 16, 2015

(86) PCT No.: PCT/GB2015/050082
§ 371 (c)(1),
(2) Date: Jul. 18, 2016

(87) PCT Pub. No.: WO2015/107350
PCT Pub. Date: Jul. 23, 2015

(65) Prior Publication Data
US 2016/0332215 A1 Nov. 17, 2016

(30) Foreign Application Priority Data

Jan. 16, 2014 (GB) .................................. 1400725.6
Jan. 16, 2014 (GB) .................................. 1400734.8
(Continued)

(51) Int. Cl.
*F16B 5/08* (2006.01)
*B21D 39/03* (2006.01)
(Continued)

(52) U.S. Cl.
CPC .............. *B21J 15/26* (2013.01); *B21D 39/03* (2013.01); *B21J 15/025* (2013.01); *B21J 15/027* (2013.01);
(Continued)

(58) Field of Classification Search
CPC ...... H02K 41/02; F16H 25/2025; B21J 15/26; B21J 15/027; B21J 15/10; B21J 15/025;
(Continued)

(56) References Cited

U.S. PATENT DOCUMENTS 2,743,623 A 5/1956 Wells
4,218,953 A * 8/1980 Haytayan ............ F16B 19/083
206/346
(Continued)

FOREIGN PATENT DOCUMENTS

CN 1078672 A 11/1993
CN 101433935 5/2009
(Continued)

OTHER PUBLICATIONS

Lathabai et al, "Friction spot joining of an extruded Al—Mg—Si alloy," journal (2006) pp. 899-902 Science Direct, www.actamat-journals.com, Available online Aug. 22, 2006.
(Continued)

*Primary Examiner* — Sarang Afzali
*Assistant Examiner* — Darrell C Ford
(74) *Attorney, Agent, or Firm* — Michael Best & Friedrich LLP

(57) ABSTRACT

A method of inserting a rivet (2) into a workpiece (42, 44, 46) comprises moving the rivet (2) and workpiece (42, 44, 46) relative to one another, along a longitudinal axis of the rivet, so as to drive the rivet into the workpiece. The rivet is rotated about its longitudinal axis, relative to the workpiece, for at least part of the time during which it is in contact with the workpiece. The speed of said rotation, or the speed of movement along the longitudinal axis of the rivet, is altered at least once before driving of the rivet into the workpiece is complete.

32 Claims, 19 Drawing Sheets

(30) Foreign Application Priority Data

Jan. 16, 2014 (GB) .................................. 1400736.3
Jan. 16, 2014 (GB) .................................. 1400761.1

(51) Int. Cl.

| | | |
|---|---|---|
| B21J 15/02 | (2006.01) | |
| B21J 15/10 | (2006.01) | |
| B21J 15/26 | (2006.01) | |
| B23K 20/12 | (2006.01) | |
| B23K 20/24 | (2006.01) | |
| F16H 25/20 | (2006.01) | |
| H02K 41/02 | (2006.01) | |
| B23K 101/00 | (2006.01) | |
| B23K 103/00 | (2006.01) | |
| B23K 103/04 | (2006.01) | |
| B23K 103/08 | (2006.01) | |
| B23K 103/10 | (2006.01) | |
| B23K 103/14 | (2006.01) | |
| B23K 103/16 | (2006.01) | |
| B23K 103/18 | (2006.01) | |
| B23K 103/20 | (2006.01) | |
| B23K 103/24 | (2006.01) | |
| B23K 20/227 | (2006.01) | |
| B23K 20/233 | (2006.01) | |
| B23K 26/352 | (2014.01) | |

(52) U.S. Cl.
CPC ............ B21J 15/10 (2013.01); B23K 20/127 (2013.01); B23K 20/1265 (2013.01); B23K 20/227 (2013.01); B23K 20/2333 (2013.01); B23K 20/24 (2013.01); B23K 26/352 (2015.10); F16B 5/08 (2013.01); F16H 25/2025 (2013.01); H02K 41/02 (2013.01); B23K 2101/006 (2018.08); B23K 2103/04 (2018.08); B23K 2103/05 (2018.08); B23K 2103/10 (2018.08); B23K 2103/14 (2018.08); B23K 2103/15 (2018.08); B23K 2103/16 (2018.08); B23K 2103/172 (2018.08); B23K 2103/18 (2018.08); B23K 2103/20 (2018.08); B23K 2103/24 (2018.08); B23K 2103/34 (2018.08); B23K 2103/42 (2018.08)

(58) Field of Classification Search
CPC .. B21D 39/03; B23K 20/1265; B23K 20/227; B23K 20/2333; B23K 20/24; B23K 26/0066; B23K 20/127; B23K 2203/172; B23K 2203/16; B23K 2203/34; B23K 2203/14; B23K 2203/24; B23K 2203/42; B23K 2203/05; B23K 2203/15; B23K 2201/006; B23K 2203/04; B23K 2203/18; B23K 2203/20; B23K 2203/10; F16B 5/08; F16B 5/04; F16B 19/083; F16B 19/086
USPC .............. 29/525.01, 525.05, 525.06; 411/501
See application file for complete search history.

(56) References Cited

U.S. PATENT DOCUMENTS

| | | | | |
|---|---|---|---|---|
| 4,762,261 A * | 8/1988 | Hawly | ............... | B21J 15/14 227/111 |
| 5,256,017 A | 10/1993 | Smirnov et al. | | |
| 5,354,160 A * | 10/1994 | Pratt | ............... | B21J 15/00 29/243.521 |
| 5,752,305 A | 5/1998 | Cotterill et al. | | |
| 5,829,115 A * | 11/1998 | Speller, Jr. | ............... | B21J 15/26 29/525.06 |
| 6,179,192 B1 | 1/2001 | Chopp | | |
| 6,234,034 B1 | 5/2001 | Ando | | |
| 6,988,862 B1 * | 1/2006 | Iguchi | ............... | B21J 15/025 29/524.1 |
| 7,032,296 B2 * | 4/2006 | Zdravkovic | ............ | B21J 15/025 29/243.53 |
| 8,302,273 B2 * | 11/2012 | Muller | ............... | B23P 19/02 29/238 |
| 8,413,532 B2 | 4/2013 | Wu | | |
| 8,549,723 B2 | 10/2013 | Condliff | | |
| 10,173,370 B2 * | 1/2019 | Ueno | ............... | B21D 39/032 |
| 2001/0003859 A1 * | 6/2001 | Mauer | ............... | B21J 15/025 29/407.04 |
| 2002/0125297 A1 * | 9/2002 | Stol | ............... | B21J 15/027 228/112.1 |
| 2002/0166221 A1 * | 11/2002 | Clew | ............... | B21J 15/025 29/407.02 |
| 2003/0029903 A1 | 2/2003 | Kashiki et al. | | |
| 2003/0154588 A1 * | 8/2003 | Blacket | ............... | B21J 15/025 29/456 |
| 2004/0096295 A1 * | 5/2004 | Stevenson | ............... | F16B 5/04 411/501 |
| 2004/0118900 A1 | 6/2004 | Stevenson et al. | | |
| 2007/0034662 A1 | 2/2007 | Opper et al. | | |
| 2008/0056842 A1 | 3/2008 | Stevenson et al. | | |
| 2008/0093420 A1 | 4/2008 | Mauer | | |
| 2010/0088880 A1 * | 4/2010 | Wang | ............... | B21J 15/025 29/524.1 |
| 2011/0164945 A1 * | 7/2011 | Lathabai | ............... | B21J 5/066 411/501 |
| 2011/0304231 A1 | 12/2011 | Wu | | |
| 2012/0167366 A1 * | 7/2012 | Mauer | ............... | B21J 15/025 29/407.08 |
| 2013/0273312 A1 * | 10/2013 | Campbell | ............... | B32B 7/08 428/137 |
| 2014/0222011 A1 * | 8/2014 | Keller | ............... | B32B 1/00 606/104 |
| 2015/0328676 A1 * | 11/2015 | Zinn | ............... | B21J 5/066 173/4 |
| 2018/0117666 A1 * | 5/2018 | Trinick | ............... | B21K 1/58 |
| 2018/0161850 A1 * | 6/2018 | Gao | ............... | B23K 20/1295 |
| 2018/0375447 A1 * | 12/2018 | Nomura | ............... | H02P 7/02 |
| 2019/0039119 A1 * | 2/2019 | Li | ............... | B21J 15/027 |
| 2019/0039168 A1 * | 2/2019 | Hori | ............... | B23K 20/129 |

FOREIGN PATENT DOCUMENTS

| | | |
|---|---|---|
| CN | 201246383 Y | 5/2009 |
| CN | 101451599 | 6/2009 |
| CN | 101468421 | 7/2009 |
| CN | 101537252 | 9/2009 |
| CN | 101817142 | 9/2010 |
| CN | 102686329 A | 9/2012 |
| CN | 202481711 | 10/2012 |
| CN | 103228375 | 7/2013 |
| CN | 103240564 | 8/2013 |
| CN | 103260790 A | 8/2013 |
| CN | 203253869 | 10/2013 |
| CN | 103990756 | 8/2014 |
| DE | 19743277 | 5/1999 |
| DE | 102004015568 | 10/2005 |
| DE | 102010046318 | 3/2012 |
| JP | S594981 A | 1/1984 |
| JP | H01254342 | 10/1989 |
| JP | 2002174219 | 6/2002 |
| JP | 2002229639 A | 8/2002 |
| JP | 2002364617 | 12/2002 |
| JP | 2005291382 | 10/2005 |
| JP | 2006043769 A | 2/2006 |
| JP | 4517362 B2 | 8/2010 |
| JP | 5055104 | 10/2012 |
| JP | 2013148122 A | 8/2013 |
| KR | 20040090612 A | 10/2004 |
| KR | 10 2011 0036 624 | 4/2011 |
| KR | 10 2011 0131 826 | 12/2011 |
| KR | 10 2013 0070 362 | 6/2013 |
| KR | 10 2013 0134 180 | 12/2013 |

(56) References Cited

FOREIGN PATENT DOCUMENTS

| KR | 10 2013 0140 711 | 12/2013 |
|---|---|---|
| WO | 94/14554 | 7/1994 |
| WO | WO9414554 | 7/1994 |

OTHER PUBLICATIONS

PCT/GB2015/050085 International Search Report dated Apr. 8, 2015 (6 pages).
PCT/GB2015/050084 International Search Report dated Apr. 20, 2015 (5 pages).
PCT/GB2015/050083 International Search Report and Written Opinion dated Mar. 27, 2015 (12 pages).
Office Action from the Korean Intellectual Property Office for Application No. 10-2016-7021078 dated Jul. 10, 2017 (5 pages).
First Office Action from the State Intellectual Property Office of China for Application No. 10-2016-7021130 dated Jul. 18, 2017 (3 pages).
First Office Action from the State Intellectual Property Office of China for Application No. 10-2016-7021353 dated Jul. 18, 2017 (15 pages).
Chinese First Office action for Application No. 20150004824.9 dated Sep. 29, 2017 (8 pages English translation included).
Chinese First Office action for Application No. 201580013385.8 dated Oct. 30, 2017 (21 pages English translation included).
Chinese First Office action for Application No. 2015800049330 dated 4th Dec. 4, 2017 (7 pages English translation included).
Korean Decision to Grant for Application No. KR10-2016-7021130 dated Feb. 23, 2018 (6 pages including statement of relevance).
International Search Report and Written Opinion, PCT/GB2015/050082, dated Jun. 9, 2015, 17 pages.
Chinese Patent First Office Action for Application No. 201580047956 dated Apr. 3, 2018 (8 pages including English translation).
Second Office Action issued by the Chinese Patent Office for related Application No. 201580013385.8 dated Aug. 31, 2018 (26 pages including English translation).
Japan Office Action Summary for related Application No. 2016-564425 dated Oct. 2, 2018 (1 page).
Japan Office Action for related Application No. 2016-564424 dated Nov. 13, 2018 (8 pages including English translation).
Japan Office Action Summary for related Application No. 2016-564426 dated Dec. 4, 2018 (1 page).
Japan Office Action for related Application No. 2016-5644243 dated Jan. 15, 2019 (5 pages including English translation).

\* cited by examiner

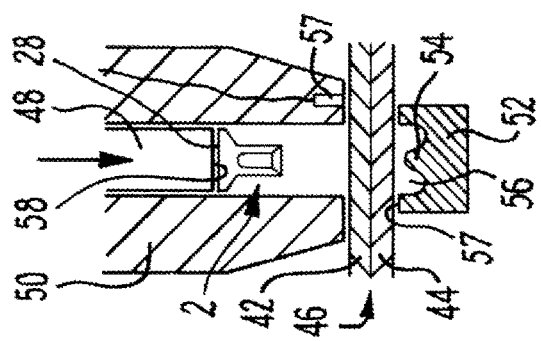
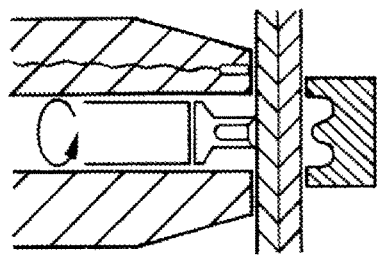
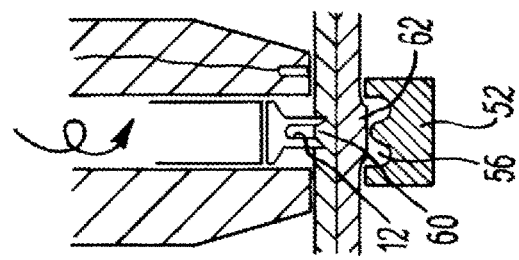
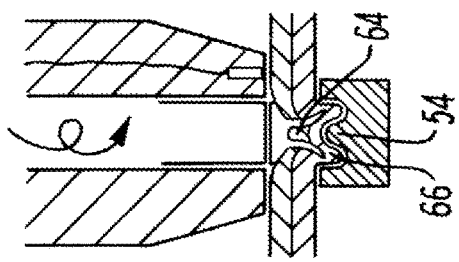
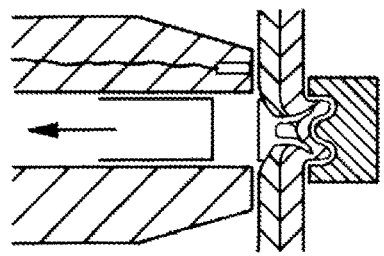

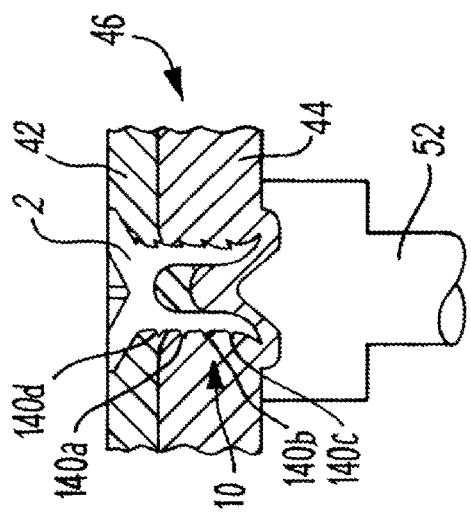
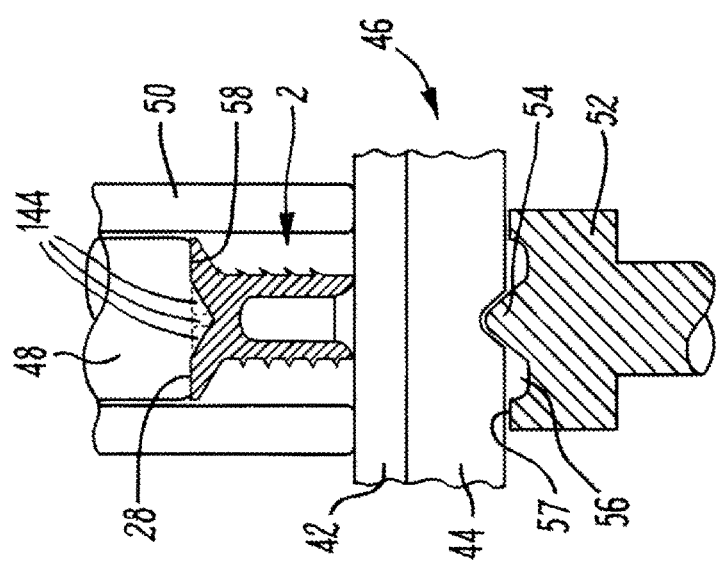
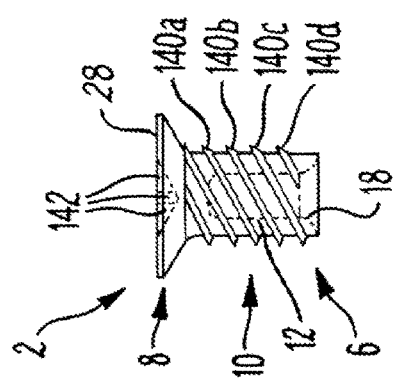

METHOD OF RIVETING

RELATED APPLICATION DATA

This patent application is a national stage filing under 35 U.S.C. 371 of International Application No. PCT/GB2015/050082 filed Jan. 16, 2015, which claims priority to United Kingdom Patent Application No. 1400761.1, filed Jan. 16, 2014, United Kingdom Patent Application No. 1400736.3, filed Jan. 16, 2014, United Kingdom Patent Application No. 1400725.6, filed Jan. 16, 2014, and United Kingdom Patent Application No. 1400734.8, filed Jan. 16, 2014, the entire contents of all of which are herein incorporated by reference.

BACKGROUND OF THE INVENTION

The present invention relates to a method of riveting which is of particular, but not exclusive, application to the automotive industry.

Self-piercing riveting (SPR) is a spot-joining technique in which a self-piercing rivet is driven, by a punch, into a layered workpiece supported on a die. The die is shaped so that as the rivet is driven into the workpiece towards the die, the material of the workpiece plastically deforms. This flow of workpiece material causes the annular tip of the rivet to flare outwards and remain encapsulated by an upset annulus of the workpiece material. The flared tip of the rivet interlocking with the upset annulus of the workpiece prevents removal of the rivet or separation of the layers of the workpiece.

Because SPR requires plastic flow of workpiece material to allow penetration and upsetting of the rivet, some materials are usually considered unsuitable for this technique. For example, magnesium alloys, ultra high strength steel (UHSS) and aircraft grade aluminium are not considered to have sufficient ductility for conventional SPR—a conventional rivet of sufficient column strength to penetrate materials of this hardness is too resistant to flaring to be properly upset. As another example, polymeric workpiece layers or those of composite materials may crack or fracture upon contact with the rivet, rather than deforming plastically, and this can produce a weak joint and/or one which is more exposed to oxidation through moisture ingress. SPR is therefore conventionally only used for materials such as standard grades of steel and forming grade aluminium.

Solid riveting (i.e. conventional riveting) is another spot joining technique. A rivet with a cylindrical shank and enlarged head is inserted into a pre-formed hole in a workpiece, so that its head abuts the top surface of the workpiece and the shank protrudes from the layered workpiece on the other side. The protruding end of the shank is then upset, for instance using a hammer or press in conjunction with a bucking bar, peening the end of the shank to form a radially enlarged lobe which prevents removal of the rivets or separation of the layers of the workpiece. One problem with solid riveting is the requirement for pre-formed holes in workpieces. This increases the complexity and duration (and thus cost) of the joining process. In addition, steps must be taken to hold a workpiece in position after the holes have been formed, so as to prevent different layers (and thus the holes therein) from becoming misaligned while the rivet and associated tooling is maneuvered into place.

Another known spot-joining technique is friction stir spot welding. In friction stir spot welding a cylindrical punch with a shouldered probe at its tip is rotated and driven into the workpiece layers to be joined. Sliding friction between the probe and the workpiece layers causes the layers to soften and plasticize without melting, and the rotation of the probe displaces the material and causes the plasticized portions of the two layers to intermingle. When the punch is withdrawn and the workpiece allowed to cool, the intermingled plasticized portions harden and produce a welded joint between the two layers.

Friction stir spot welding is only used to weld materials of very similar composition, since the above intermingled plasticized portions can only be formed if the materials of the workpiece soften at similar temperatures. Further, some materials are unsuitable for friction stir spot welding at all, for instance those which do not soften with temperature in the required manner (such as thermosetting polymers), or those which undergo an alteration in mechanical properties at the temperature required (for instance, hardened steel may be brought out of temper in the region of a friction stir spot weld).

It is an object of the present invention to mitigate or obviate one of the aforesaid disadvantages, and/or to provide an improved or alternative method of riveting.

SUMMARY OF THE INVENTION

According to a first aspect of the present invention there is provided a method of inserting a rivet into a workpiece, the method comprising moving the rivet and workpiece relative to one another, along a longitudinal axis of the rivet, so as to drive the rivet into the workpiece, wherein:
  the rivet is rotated about its longitudinal axis, relative to the workpiece, for at least part of the time during which it is in contact with the workpiece;
  the speed of said rotation, or the speed of movement along the longitudinal axis of the rivet, is altered at least once before driving of the rivet into the workpiece is complete;
  one axial end of the rivet has a tip for piercing the workpiece, and the rivet has a substantially cylindrical shank extending longitudinally from the tip; and
  the shank has one or more surface irregularities.

In this or any other aspect of the invention, said movement of the rivet in a workpiece relative to one another along the longitudinal axis of the rivet may involve moving the rivet along its longitudinal axis relative to the workpiece, moving the workpiece along the longitudinal axis of the rivet relative to the rivet, or moving both relative to one another. Alteration of the speed of rotation or the speed of movement along the longitudinal axis of the rivet may be an increase in that speed or a decrease in that speed. The speed before or after the alteration may be substantially zero. The alteration in the rotational or axial speed of the rivet may take place while the rivet is in contact with the workpiece, for example during the time in which it is driven into the workpiece.

One or more of said surface irregularities may be provided on a radially outer shank surface.

The rivet may have a bore which runs through the tip and through at least a portion of the shank, thereby providing a radially inner shank surface, and one or more of said surface irregularities are provided on the radially inner shank surface.

One or more of said surface irregularities may be elongate in shape

One or more of said elongate surface irregularities may be aligned substantially longitudinally.

Alternatively or in addition, one or more of said elongate surface irregularities may be aligned substantially circumferentially.

Alternatively or in addition, one or more of said elongate surface irregularities may each be substantially in the shape of a helical arc.

One or more of said surface irregularities may each take the form of a projection.

One or more of said surface irregularities may each take the form of an opening.

The or each opening may take the form of a recess, a bore, or a flat surface (the flat surface effectively being recessed behind the cylindrical outer surface of the remainder of the rivet shank).

Where a rivet comprises one or more of said openings, one or more of those openings may extend between the radially inner shank surface and the radially outer shank surface.

A rivet comprising more than one surface irregularities may comprise irregularities of different forms. For instance, it may comprise an axial array of annular grooves and a circumferential array of longitudinal grooves, providing the shank with a knurled surface. As another example, a rivet may comprise one projection and three openings.

According to a second aspect of the present invention there is provided method of inserting a rivet into a workpiece, the method comprising moving the rivet and workpiece relative to one another, along a longitudinal axis of the rivet, so as to drive the rivet into the workpiece, wherein:
  the rivet is rotated about its longitudinal axis, relative to the workpiece, for at least part of the time during which it is in contact with the workpiece;
  the speed of said rotation, or the speed of movement along the longitudinal axis of the rivet, is altered at least once before driving of the rivet into the workpiece is complete; and
  one axial end of the rivet has a circumferentially discontinuous tip for piercing the workpiece, and the rivet has a substantially cylindrical shank which extends longitudinally from the tip and provides a radially outer shank surface;

A circumferentially discontinuous tip may be considered to be present if in a plane which is normal to the longitudinal axis of the rivet and which intersects the most axially distal point on the tip, at at least one radial distance from the rivet longitudinal axis the tip intersects the plane at another angular position, and does not intersect the plane at another angular position. In other words, a tip may be considered to be circumferentially discontinuous if in the above plane at least a radial portion of the tip is not circular or annular in shape. For example, a star-shaped tip may be considered to be circumferentially discontinuous in that its radially outer portion is not annular in shape, since at large radial distances from the longitudinal axis the tip would intersect the plane at the angular positions of the points on the star but not at the angular positions of the spaces between the points. As another example, a tip in the shape of a rifled gun barrel may be considered to be circumferentially discontinuous in that its radially inner portion (i.e. the portion in which the 'rifling' is cut) is not annular in shape, since at small radial distances from the longitudinal axis the tip would intersect the plane at the angular position of the lands of the 'rifling' but not at the angular positions of the grooves of the 'rifling'.

The circumferentially discontinuous tip may be provided by one or more surface irregularities of the form described in relation to the first aspect of the invention.

The circumferentially discontinuous tip may comprise a plurality of teeth.

The tip may be circumferentially discontinuous across its entire radial extent.

A rivet may be considered to be circumferentially discontinuous across its entire radial extent if where in a plane which is normal to the longitudinal axis of the rivet and which intersects the most axially distal point on the tip, at all least one radial distance from the rivet longitudinal axis the tip intersects the plane at one angular position, and does not intersect the plane at another angular position. In other words, a tip may be considered to be circumferentially discontinuous across its entire radial extent if in the above plane no radial portion of the tip is circular or annular in shape. For example, a star-shaped tip may not be considered to be circumferentially discontinuous across its entire radial extent because its hub portion may be considered to be annular in shape, since at small radial distances from the longitudinal axis the tip would intersect the plane at all angular positions of the points on the. As another example, a tip in the shape of a rifled gun barrel may not be considered to be circumferentially discontinuous in that its radially outer portion annular in shape, since at large radial distances from the longitudinal axis the tip would intersect the plane at every angular position. A crescent-shaped tip, for example, may be considered to be circumferentially discontinuous across its entire radial extent. A tip with a cutting rim which is undulating or crenelated may also be considered to be circumferentially discontinuous across its entire axial width.

The rivet may have a bore which runs through the tip and through at least a portion of the shank, thereby providing a substantially tubular shank portion with a radially inner shank surface.

Where the rivet has such a bore, the tip may be provided by substantially longitudinal slots in the substantially tubular portion.

The slots may extend between the radially inner shank surface and the radially outer shank surface.

Alternatively, the slots may be provided in the radially outer surface or radially inner surface of the shank but not penetrate the full thickness of the shank wall.

The tip may have an internal taper surface which intersects the radially inner shank surface.

Alternatively or in addition, the tip may have an external taper surface which intersects the radially outer shank surface.

Where the tip does not have a bore or concavity, the external taper surface may taper to a point (which may or may not be intersected by the longitudinal axis).

The taper surface may intersect said surface at an angle of less than 50 degrees, for instance less than 40 degrees or less than 30 degrees.

Where the tip has an internal and/or external taper surface, the or each taper surface may be faceted.

Alternatively, the taper surface(s) may be smooth, textured (for instance by knurling), undulating, or have any other suitable shape.

The tip may define a plane which is not perpendicular to the longitudinal axis of the rivet.

For example, the plane may be positioned at an angle of at least 1 degree, for instance at least 5 degrees or at least 10 degrees, to the longitudinal axis. Alternatively or in addition, the plane may be positioned at an angle of less than 40 degrees, for instance less than 30 degrees or less than 20 degrees, to the longitudinal axis.

Such a tip is circumferentially discontinuous in that the tip would intersect the plane described above at a single point.

According to a third aspect of the present invention there is provided a method of inserting a rivet into a workpiece, the method comprising moving the rivet and workpiece relative to one another, along a longitudinal axis of the rivet, so as to drive the rivet into the workpiece, wherein:
- the rivet is rotated about its longitudinal axis, relative to the workpiece, for at least part of the time during which it is in contact with the workpiece;
- the speed of said rotation, or the speed of movement along the longitudinal axis of the rivet, is altered at least once before driving of the rivet into the workpiece is complete; and
- the workpiece comprises a layer made of magnesium, aircraft aluminium, ultra-high strength steel, titanium, or metal matrix composite.

Ultra-high strength steel may be considered to be steel with an ultimate tensile strength above around 1000 MPa, or steel with an elongation percentage below around 12.5%. Aircraft grade aluminium may be considered to be aluminium with an elongation percentage below around 12.5%. Aircraft grade aluminium may for instance be 7000 series or 2000 series aluminium.

The workpiece may comprises a further layer, made from magnesium, aircraft aluminium, ultra-high strength steel, titanium, metal matrix composite, carbon fibre composite or a polymer.

Instead or as well, the workpiece may comprise an additional layer made from standard grade steel or forming grade aluminium, and the rivet may be inserted into the workpiece whereby the additional layer is the final layer contacted by the rivet.

Standard grade steel may be considered to be steel with an ultimate tensile strength below around 1000 MPa, or steel with an elongation percentage above around 12.5%. Forming grade aluminium may be considered to be aluminium with an elongation percentage above around 12.5%.

According to a fourth aspect of the present invention there is provided method of inserting a rivet into a workpiece, the method comprising moving the rivet and workpiece relative to one another, along a longitudinal axis of the rivet, so as to drive the rivet into the workpiece, wherein:
- the rivet is rotated about its longitudinal axis, relative to the workpiece, for at least part of the time during which it is in contact with the workpiece;
- the speed of said rotation, or the speed of movement along the longitudinal axis of the rivet, is altered at least once before driving of the rivet into the workpiece is complete; and
- the rivet is made from aluminium, stainless steel, titanium or a ceramic.

The rivet being made from one of these materials may allow the rivet, and a joint formed therewith, to be more resistant to corrosion (such as oxidation).

According to a fifth aspect of the present invention there is provided a method of inserting a rivet into a workpiece using a riveting tool, the method comprising moving the rivet and workpiece relative to one another, along a longitudinal axis of the rivet, so as to drive the rivet into the workpiece, wherein:
- the rivet is rotated about its longitudinal axis, relative to the workpiece, by the riveting tool for at least part of the time during which it is in contact with the workpiece;
- the speed of said rotation, or the speed of movement along the longitudinal axis of the rivet, is altered at least once before driving of the rivet into the workpiece is complete; and
- the riveting tool drives the rivet to rotate though one or more rotary drive components in frictional engagement with the rivet.

The riveting tool may comprise a tool nose and a punch reciprocally disposed therein, the punch providing axial force to the rivet so as to drive it into the workpiece.

Where the relative movement of the workpiece and rivet along the longitudinal axis of the rivet takes place by moving the workpiece, the axial force from the punch may be a reaction force.

The or one of said rotary drive components may be the punch.

Instead or as well, the or one of said rotary drive components may be the tool nose.

Where the tool nose is a rotary drive component, the riveting tool may comprise a pressure surface which is rotatably mounted to the nose, the pressure surface contacting the workpiece during insertion of the rivet and rotating relative to the nose for at least part of the time it is in contact with the workpiece.

According to a sixth aspect of the present invention there is provided a method of inserting a rivet into a workpiece using a riveting tool, the method comprising moving the rivet and workpiece relative to one another, along a longitudinal axis of the rivet, so as to drive the rivet into the workpiece, wherein:
- wherein the riveting tool comprises a tool nose and a punch reciprocally disposed therein;
- the punch provides axial force to the rivet so as to drive it into the workpiece;
- the rivet is rotated about its longitudinal axis, relative to the workpiece, by the nose of the riveting tool for at least part of the time during which it is in contact with the workpiece; and
- the speed of said rotation, or the speed of movement along the longitudinal axis of the rivet, is altered at least once before driving of the rivet into the workpiece is complete.

The punch may not rotate relative to the workpiece during driving of the rivet into the workpiece Alternatively, the punch may rotate along with the rivet. For instance, the punch may be rotatable so as to allow it to freewheel, or the tool nose may be in driving engagement with the punch.

The punch rotating along with the rivet may be beneficial in that it may reduce the speed of wear experienced by the punch at the interface between the punch and a rotating surface (for example a surface of the rivet or of another component of the riveting tool).

According to a seventh aspect of the present invention there is provided a method of inserting a rivet into a workpiece using a riveting tool, the method comprising moving the rivet and workpiece relative to one another, along a longitudinal axis of the rivet, so as to drive the rivet into the workpiece, wherein:
- the rivet is rotated about its longitudinal axis, relative to the workpiece, by the riveting tool for at least part of the time during which it is in contact with the workpiece;
- the speed of said rotation, or the speed of movement along the longitudinal axis of the rivet, is altered at least once before driving of the rivet into the workpiece is complete; and
- the riveting tool drives the rivet to rotate though a rotary drive component which engages with the rivet about the circumferential periphery of a portion of the rivet.

The rivet may have a tip for piercing the workpiece at one axial end, a shank extending longitudinally from the tip, and a head extending radially outwards from the shank.

Where the rivet has a head, the portion of the rivet engaged by the rotary drive component may include a radially peripheral edge or surface defined by the head. Instead or as well, the portion of the rivet engaged by the rotary drive component may include a fillet or chamfer at the intersection between the head and the shank.

According to an eighth aspect of the present invention there is provided a method of inserting a rivet into a workpiece, the method comprising moving the rivet and workpiece relative to one another, along a longitudinal axis of the rivet, so as to drive the rivet into the workpiece, wherein:
- the rivet is rotated about its longitudinal axis, relative to the workpiece, for at least part of the time during which it is in contact with the workpiece;
- the speed of said rotation, or the speed of movement along the longitudinal axis of the rivet, is altered at least once before driving of the rivet into the workpiece is complete; and
- the rivet has a longitudinal bore which extends along its entire axial length.

The rivet may be rotated by a rotary drive component of a riveting tool, the rotary drive component engaging with a section of the bore which has a non-circular cross section. Said portion of the bore may be, for example, square, hexagonal or ovoid in cross section.

The rotary drive component may be a punch which provides axial force to the rivet so as to drive it into the workpiece, the punch engaging with said section of the bore through a complementarily-shaped driving bit projecting therefrom.

The driving bit may be movable between an extended position in which it projects from a distal surface of the punch, to a retracted position in which it projects from said distal surface of the punch to a reduced extent or is flush with said distal surface of the punch.

The rivet may be substantially symmetrical along its longitudinal axis.

The punch may have a profiled tip which applies said axial force to one axial end of the rivet, and deforms that end of the rivet during driving of the rivet into the workpiece.

According to a ninth aspect of the present invention there is provided a method of inserting a rivet into a workpiece, the method comprising moving the rivet and workpiece relative to one another, along a longitudinal axis of the rivet, so as to drive the rivet into the workpiece, wherein:
- the rivet is rotated about its longitudinal axis, relative to the workpiece, for at least part of the time during which it is in contact with the workpiece;
- the speed of said rotation, or the speed of movement along the longitudinal axis of the rivet, is altered at least once before driving of the rivet into the workpiece is complete;
- the rivet has a tip for piercing the workpiece at one axial end, a shank extending longitudinally from the tip, and a head extending radially outwards from the shank;
- the head defines an underside which faces towards the tip; and
- the rivet has a cavity provided in the underside of the head, or in a portion of the shank adjacent thereto, within which workpiece material may be accommodated.

Where such a cavity is provided in the shank, it may constitute a surface irregularity according to the first aspect of the invention.

Workpiece material may enter the cavity during insertion of the rivet into the workpiece.

Alternatively, the cavity may be provided to guard against eventualities, workpiece material remaining clear of the cavity when the method is performed correctly.

According to a tenth aspect of the present invention there is provided a method of inserting a rivet into a workpiece, the method comprising moving the rivet and workpiece relative to one another, along a longitudinal axis of the rivet, so as to drive the rivet into the workpiece, wherein:
- the rivet is rotated about its longitudinal axis, relative to the workpiece, for at least part of the time during which it is in contact with the workpiece;
- the speed of said rotation, or the speed of movement along the longitudinal axis of the rivet, is altered at least once before driving of the rivet into the workpiece is complete;
- the rivet has a tip for piercing the workpiece at one axial end, a shank extending longitudinally from the tip, and a head extending radially outwards from the shank; and
- a portion of the shank at the end of the rivet nearest the head has a larger diameter than the remainder of the shank.

Said portion of the shank may constitute an annular circumferential projection according to the first aspect of the invention.

Said portion of the shank may be substantially cylindrical.

Alternatively, said portion of the shank may be frusto-conical.

According to an eleventh aspect of the present invention there is provided a method of inserting a rivet into a workpiece, the method comprising moving the rivet and workpiece relative to one another, along a longitudinal axis of the rivet, so as to drive the rivet into the workpiece, wherein:
- the rivet is rotated about its longitudinal axis, relative to the workpiece, for at least part of the time during which it is in contact with the workpiece;
- the speed of said rotation, or the speed of movement along the longitudinal axis of the rivet, is altered at least once before driving of the rivet into the workpiece is complete; and
- auxiliary heating is applied to the workpiece and/or the rivet at at least one point before, during or after driving of the rivet into the workpiece.

Auxiliary heating may be utilised so as to soften workpiece material instead of or as well as frictional heating through contact with the rivet.

The auxiliary heating may be provided at least in part by a laser beam.

Instead or as well, the auxiliary heating may be provided at least in part by ultrasonic energy.

Where the auxiliary heating is provided at least in part by ultrasonic energy, the rivet may be is driven into the workpiece towards a die, and at least part of said ultrasonic energy may be applied to the workpiece by the die. Alternatively or in addition, ultrasonic energy may be applied to the workpiece and/or the rivet by a tool nose or a punch.

In any aspect of the present invention, the rivet may pierce a first workpiece layer at a first rotational speed, before piercing a second workpiece layer at a second rotational speed.

The first rotational speed may be higher than the second rotational speed.

Alternatively, the first rotational speed may be lower than the second rotational speed.

The rivet may pierce a first workpiece layer at a first axial speed, before piercing a second workpiece layer at a second axial speed.

Where a rivet pierces a first workpiece layer at a first rotational speed before piercing a second workpiece layer at a second rotational speed, and pierces a first workpiece layer at a first axial speed before piercing a second workpiece layer at a second axial speed, the first workpiece pierced at the first rotational speed may or may not be the same layer as the first workpiece layer pierced at the first axial speed. Similarly, the second workpiece pierced at the second rotational speed may or may not be the same layer as the second workpiece layer pierced at the second axial speed.

The first axial speed may be higher than the second axial speed.

Alternatively, the first axial speed may be lower than the second axial speed.

The rivet may penetrate at least a portion of the workpiece with a rotational speed of substantially zero.

Substantially zero may be considered to mean zero sufficiently low to have negligible effect on the behaviour of the rivet and the workpiece.

The speed of substantially zero may or may not be the first rotational speed or the second rotational speed described above.

The speed of rotation of the rivet may be altered at least twice before driving of the rivet into the workpiece is complete.

The axial speed of the rivet may be altered at least twice before driving of the rivet into the workpiece is complete.

The (axial or rotational) speed being altered at least twice is not intended to be limited to the rivet moving at three different axial/rotational speeds. For example, the rotational or axial speed of the rivet may be altered once, then altered a second time to bring its speed back to its initial value.

The or at least one of the alterations in axial or rotational speed of the rivet may be brought about by resistive forces applied to the rivet by the workpiece.

For example, the speed of the rivet may decay as the depth to which has penetrated the workpiece increases (as increased depth of penetration may result in increased resistive forces), irrespective of the material composition of the layers of the workpiece, or as the rivet contacts a different layer of the workpiece (which may be harder, and thus provide increased resistive force).

The or at least one of the alterations in speed of rotation of the rivet may be brought about by an alteration in the magnitude of the torque applied to the rivet so as to cause it to rotate.

The or at least one of the alterations in axial speed of the rivet may be brought about by an alteration in the magnitude of axial force applied to the rivet or workpiece so as to drive the rivet into the workpiece.

The axial force applied to drive the rivet into the workpiece may be substantially constant.

The or at least one of the alterations in axial or rotational speed of the rivet may occur as a result of the rivet contacting different layers within the workpiece.

The alterations in speed may be due to resistive forces as described above, or as a result of active control. For example, a riveting tool inserting the rivet may detect the position of the rivet within the workpiece and alter its speed in response.

The axial movement of the rivet relative to the workpiece may be paused at at least one point before driving of the rivet into the workpiece is complete. For example, the axial movement of the rivet relative to the workpiece may be paused when the rivet first contacts a layer of the workpiece. Said layer may be the top layer of the workpiece, at which point the axial movement of the rivet relative to the workpiece would be paused when the rivet first contacts the workpiece.

According to a twelfth aspect of the present invention there is provided a method of manufacturing a product, the method comprising fastening together two or more layers of a workpiece using a method according to any of the first to the eleventh aspects of the invention.

According to a thirteenth aspect of the present invention there is provided a product manufactured using a method according to the twelfth aspect of the invention.

In the eleventh or twelfth aspects of the invention the product may be a vehicle, such as a motorcycle, car, van, lorry or aircraft.

According to a fourteenth aspect of the present invention there is provided a rivet having the features of any of the first, second, fourth, eighth, ninth or tenth aspects of the invention.

Aspects of the invention may be particularly suited for use with workpieces which have one or more layers with a ductility below around 12.5% elongation, for instance below around 10% elongation. For example, aspects of the invention may be particularly suited for use with workpieces formed from magnesium (magnesium may have an elongation percentage of around 8%). Aspects of the invention may also be particularly suited for use with workpieces which have one or more layers with an ultimate tensile strength above around 1000 MPa, for instance above around 1,200 MPa.

BRIEF DESCRIPTION OF THE DRAWINGS

Specific embodiments of the present invention will now be described, by way of example only, with reference to the accompanying drawings in which:

FIG. 4A is a cross-sectional side view of a first stage in a method according to a first embodiment of the invention;

FIG. 4B is a cross-sectional side view of a second stage in a method according to the first embodiment of the invention;

FIG. 4C is a cross-sectional side view of a third stage in a method according to the first embodiment of the invention;

FIG. 4D is a cross-sectional side view of a fourth stage in a method according to the first embodiment of the invention;

FIG. 4E is a cross-sectional side view of a fifth stage in a method according to the first embodiment of the invention;

FIG. 13A is a schematic side view of a rivet suitable for use with the invention;

FIG. 13B is a schematic side view of part of a tool suitable for inserting the rivet;

FIG. 13C is a schematic side view of a joint produced using the rivet of FIG. 13A;

DETAILED DESCRIPTION

Figure 1:
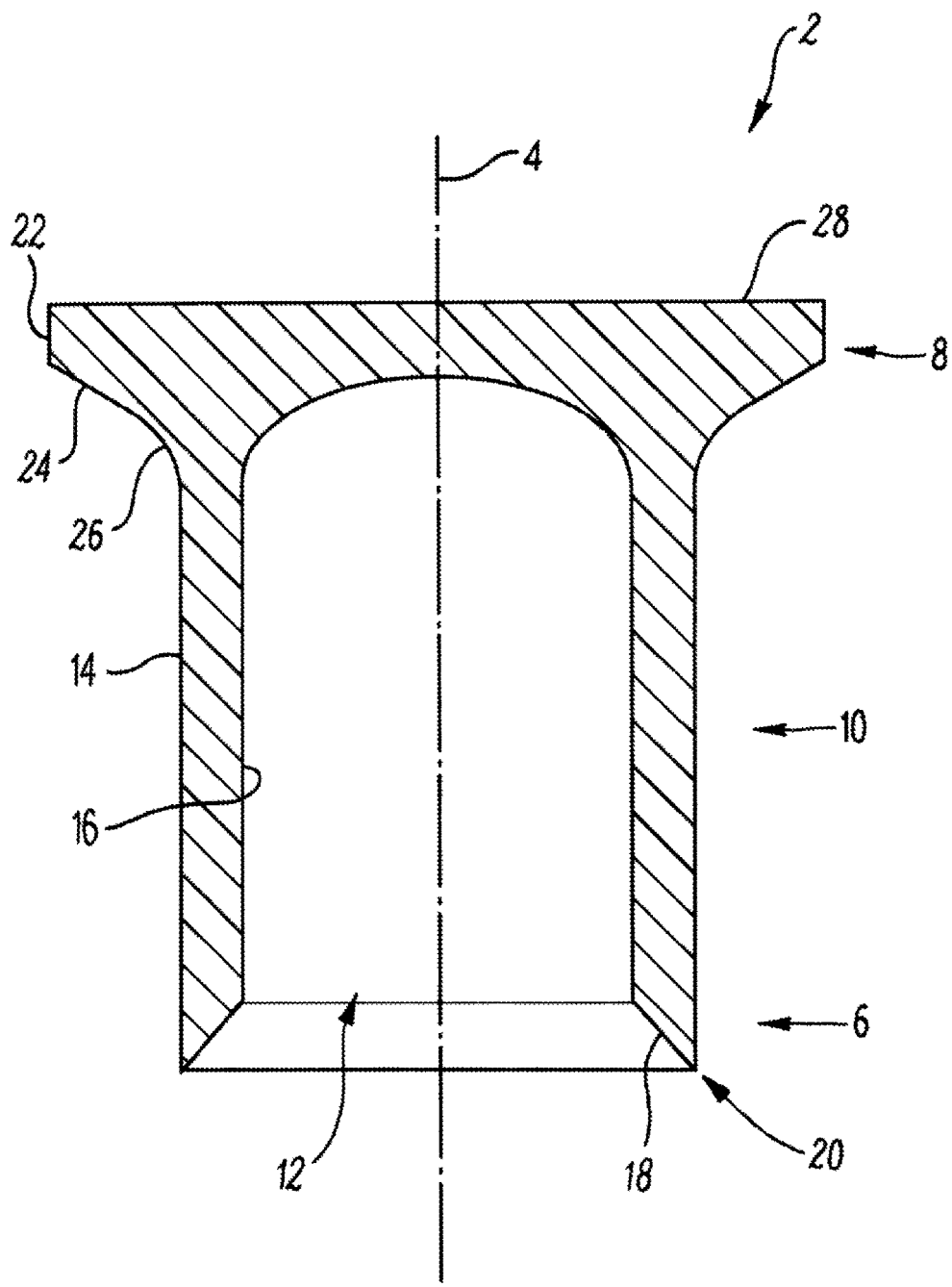
FIG. 1 is a cross-sectional side view of a conventional SPR rivet.

Referring now to the drawings, FIG. 1 shows a conventional self-piercing rivet 2. The rivet 2 defines a longitudinal axis 4, with a tip 6 at one axial end, a head 8 at the other axial end, and a substantially cylindrical shank 10 extending therebetween. The rivet also has a bore 12 which is substantially coaxial with the rivet longitudinal axis 4. In this example the bore 12 runs through the tip 6 and along the entire length of the shank 10. The shank 10 therefore defines a radially outer surface 14 and a radially inner surface 16, each of which is substantially cylindrical in shape (and positioned substantially circumferentially about the longitudinal axis 4). The tip 6 of the rivet 2 has an internal taper surface 18 which provides the tip 6 with an annular cutting rim 20. In this example, the internal taper surface 18 intersects the radially inner surface 16 of the shank 10 at an angle of around 140°. Further, the internal taper surface 18 extends sufficiently radially outwards that that the cutting rim 20 of this example may be considered to be a substantially circumferential cutting edge at the intersection of the taper surface 18 and the radially outer surface 14 of the shank.

The head 8 of the rivet 2 defines a circumferential outer periphery 22, which in this case takes the form of a substantially cylindrical surface positioned substantially circumferentially about the rivet longitudinal axis 4. The head 8 also defines an underside 24, on the side of the head nearest the tip 6 of the rivet 2. In this example, the underside 24 takes the form of a frustoconical surface positioned substantially circumferentially about the rivet longitudinal axis, which meets the radially outer surface 14 of the shank 10 at a filleted intersection 26. The head 8 further defines a pressure surface 28 upon which axial force can be applied to drive the rivet 2 into a workpiece (not visible).

In this example the bore 12 extends through the entire axial length of the shank 10, therefore the shank is substantially tubular. In other cases, however, the bore 12 may extend only part way along the shank 10. In such cases, the portion of the shank 10 through which the bore 12 runs may be referred to as the substantially tubular portion of the shank.

Figure 2:
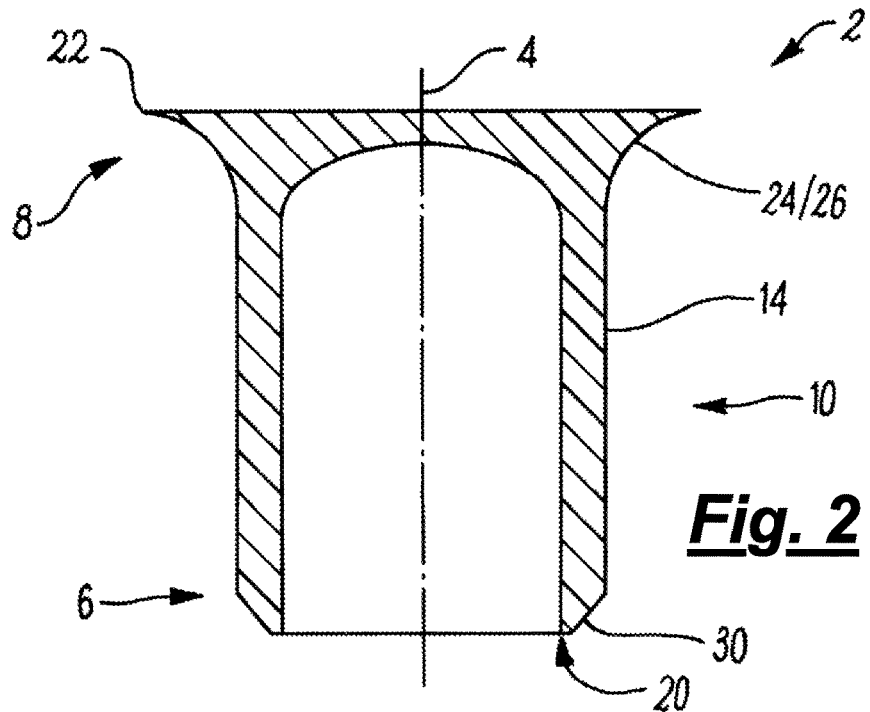
FIG. 2 is a cross-sectional side view of another conventional SPR rivet.

FIG. 2 shows another conventional SPR rivet 2, which is similar to that shown in FIG. 1. In this example, however, the tip 6 of the rivet 2 has an external taper surface 30 rather than an internal taper surface 18 as found in the rivet of FIG. 1. The external taper surface 30 intersects the radially outer surface 14 of the shank 10 (at an angle of around 140° in this case).

Further, although the cutting rim 20 of the rivet of FIG. 1 is a sharp edge, the cutting rim 20 of rivet 2 of FIG. 2 takes the form of an annular surface positioned substantially circumferentially about the rivet longitudinal axis 4. Further, in this example the underside 24 of the head 8 of the rivet 2 is defined entirely by the filleted intersection 26. Also, the circumferential outer periphery 22 of the head 8 is defined by an annular edge rather than a cylindrical surface.

Figure 3:
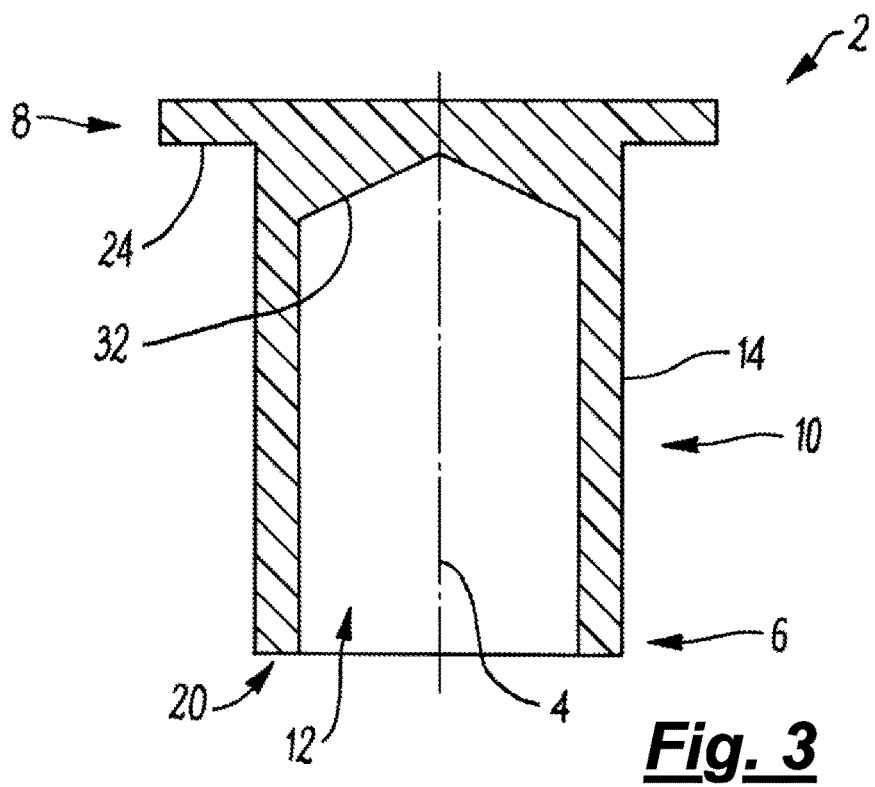
FIG. 3 is a cross-sectional side view of a further conventional SPR rivet.

FIG. 3 shows a further conventional SPR rivet 2. Unlike the rivets of FIGS. 1 and 2 the bore 12 has a tapered tip 32, rather than a rounded tip. In addition, the underside 24 of the head 8 takes the form of an annular surface positioned substantially circumferentially around the rivet longitudinal axis 4, and the junction between the underside of the head and the radially outer surface of the shank 10 does not have a filleted intersection. Furthermore, the tip 6 of the rivet 2 does not have a taper surface (18, 30 in FIGS. 1 and 2 respectively). Instead, the cutting rim 20 takes the form of an annular surface, positioned substantially circumferentially about the rivet longitudinal axis 4, extending between the radially outer and inner surfaces 14, 16 of the shank 10.

A method according to a first embodiment of the invention will now be described with reference to FIG. 4, which illustrates the stages of the method as FIGS. 4A to 4E. This embodiment is part of the production process for a motor vehicle (although it could also be used in the production of other products). In the first embodiment the workpiece 46 has a first layer 42 which is part of a vehicle chassis made of magnesium alloy, and a second layer 44 which is part of a vehicle bodywork panel made of conventional forming grade aluminium, which are joined together by inserting a rivet 2 of the type shown in FIG. 1. In this case, the rivet 2 is made out of titanium. In this embodiment the second layer 44 is an example of an 'additional layer'. The rivet 2 is inserted using a riveting tool that comprises a punch 48 reciprocally received within a tool nose 50, and a die 52. In this embodiment the tool nose 50 is substantially tubular and the punch 48 is substantially cylindrical, and the tool nose and punch are substantially coaxially arranged relative to one another. The die 52 has a pip 54 and an annular cavity 56. The pip 54 and cavity 56 are also substantially coaxial with respect one another. The tool nose 50 is resiliently connected to the punch 48 so that if the punch is moved axially the tool nose tends to go with it, but if the tool nose is prevented from moving then the punch can continue its motion. The tool nose 50 of this embodiment also has a temperature sensor 57 at its distal tip.

In the description below, the 'top' of the workpiece is the portion of the workpiece which the rivet contacts first, and the 'bottom' of the workpiece is the portion which contacts the rivet last (i.e. which contacts the die, in this case), irrespective of the spatial orientation of the workpiece relative to the ground. For instance, the rivet may be inserted into the workpiece from underneath, but will nonetheless first contact the 'top' layer.

To join the layers 42, 44 of the workpiece 46, the workpiece is positioned on an annular support surface 57 of the die 52, and a rivet 2 is mounted within the tool nose 50. More specifically, in this case the rivet 2 is mounted such that its pressure surface 28 abuts a distal surface 58 of the punch 48, and is positioned so as to be substantially coaxial with the tool nose 50 and punch 48. The tool nose 50 (along with the punch 48 and rivet 2) is positioned opposite the die 52. The tool nose 50, punch 48, and rivet 2 are thus all substantially coaxial with the pip 54 and cavity 56 of the die 52. The punch is advanced along its longitudinal axis (which is also the longitudinal axis of the tool nose 50 and the rivet 2) towards the workpiece 46 by an actuator in the form of a hydraulic cylinder (not visible), and the tool nose moves axially with it. When the tool nose 50 contacts the top of the workpiece 46 it can move no further, but the punch continues to move towards the workpiece. As a result of the resilient connection between the punch 48 and tool nose 50, the continued motion of the punch urges the tool nose against the workpiece 46. The workpiece is therefore held in position between the die 52 and the distal end of the tool nose 50. Since the distal surface 58 of the punch 48 is in contact with the pressure surface 28 of the rivet 2, as the punch 48 advances axially towards the workpiece within the tool nose 50, the rivet advances as well. This is shown in FIG. 4A. The punch and rivet are advanced towards the workpiece, for example, at an axial speed of 300 mm/s.

When the rivet 2 contacts the workpiece top surface of the workpiece 46, the axial movement of the punch 48 (and thus the rivet) is paused by the control unit. The punch 48 is then driven to rotate about its longitudinal axis within the tool nose 50 by a motor while the rivet is in contact with the workpiece 46. Due to friction between the distal surface 58 of the punch 48 and the pressure surface 28 of the rivet 2, as the punch rotates the rivet rotates with it. The punch 48 therefore functions as a rotary drive component in frictional engagement with the rivet 2. The punch is connected to a control unit (not visible) by a rotary positional encoder (not visible). Through the encoder, the control unit monitors the speed of the punch and adjusts the speed of the motor (not visible) so that the punch rotates at a constant speed, for example, in this case 6,000 RPM.

As the rivet 2 rotates about its longitudinal axis on the surface of the workpiece 46, as shown in FIG. 4B, the heat generated by the sliding friction between the rivet and the workpiece softens the workpiece in the locality of the rivet. In particular, it softens the magnesium of the first layer 42 so that it becomes sufficiently ductile to be penetrated by the rivet 2 without premature deformation of the rivet (or cracking of that layer). The control unit monitors the temperature of the top of the workpiece 46 using the sensor 57. Once the temperature has increased sufficiently, the control unit alters the speed of rotation of the rivet 2 by making an adjustment to the speed at which the punch 48 is rotated by the motor. More particularly, the speed of the punch 48, and thus of the rivet 2, is reduced, in this example, to 500 RPM. The control unit then resumes the axial advance of the punch 48 and rivet 2 under action of the hydraulic cylinder (not visible). At this point, the rivet 2 travels, for example, at an axial speed of 200 mm/s.

Continued movement of the rivet 2 relative to the workpiece 46 causes the rivet to begin penetrating the top of the workpiece (i.e. the first layer 42), as shown in FIG. 4C. As the rivet 2 penetrates the workpiece 46, some workpiece material 60 at the top of the workpiece is forced up into the bore 12 of the rivet 2. Further, the axial force applied by the rivet 2 to the workpiece 46 causes some workpiece material 62 to be forced into the cavity 56 of the die 52.

The rivet 2 continues to penetrate the workpiece 46 while rotating at 500 RPM. This speed is sufficiently low that negligible additional frictional heating is supplied, but rotation of the rivet 2 as it travels axially may reduce the extent to which workpiece material is liable to stick to the rivet and be dragged down into the workpiece 46 by the rivet. This may be desirable since workpiece material being dragged down with the rivet can lead to the top surface of the workpiece having a significant indentation in the region surrounding the rivet, which may be undesirable aesthetically or may provide greater opportunity for moisture ingress (which may, in turn, lead to oxidation in the region of the joint).

When the rivet 2 has penetrated the workpiece 46 to the point that it contacts the second workpiece layer 44, further axial travel of the rivet causes it to be upset. Workpiece material 62 from the second layer 44 forced into the cavity 56 is directed radially outwards by the pip 54. Since the tip 6 of the rivet 2 has penetrated into this portion of the workpiece, this plastic flow causes the tip to flare outwards, upsetting the rivet. Throughout insertion of the rivet 2, workpiece material 60 continues to travel up the bore 12 of the rivet.

When the rivet 2 reaches the point where its contact surface 28 is flush with the top surface of the workpiece, as shown in FIG. 4D, driving of the rivet 2 into the workpiece is complete. The control unit (not visible) therefore stops the rotation and the axial advance of the punch 48, and thus the rivet 2 stops moving as well. In the completed joint, the workpiece material 60 which entered the bore 12 of the rivet 2 forms a 'slug' 64 which in this embodiment occupies substantially all the volume of the bore, and the workpiece material 62 forced into the cavity 56 of the die 52 forms an upset annulus 66 encapsulating the flared tip of the rivet (as described above).

After the joint is completed the punch 48 is retracted, leaving the rivet 2 in place, as shown in FIG. 4E. At first, the tool nose 50 remains urged against the workpiece due to its resilient connection to the punch 48, but once the punch has been retracted sufficiently the tool nose 50 moves upwards with it and lifts off the surface of the workpiece. A subsequent rivet 2 can then be mounted in the tool nose 50, and another joint (either in a different position on the workpiece 46, or on a different workpiece) can be produced.

In this embodiment, the rotational speed of 6,000 RPM may be considered to be an example of a first rotational speed and 500 RPM an example of a second rotational speed, in which case the first rotational speed is higher than the second rotational speed. Other rotational speeds may be used.

In the case of this embodiment, the point at which penetration of the workpiece 46 by the rivet 2 commences is selected by the control unit so that the friction stir heating applied to the top layer 42 has not yet raised the temperature of the bottom layer 44 sufficiently for it to be softened to any great extent. This is because in this embodiment the second workpiece layer 44 is made of forming grade aluminium, which has suitable mechanical properties for conventional SPR. The alteration of the rotational speed of the rivet 2 is therefore timed so that the second workpiece layer 44 is largely unaffected and SPR can be performed as normal (albeit with rotation of the rivet 2 still taking place at a lower speed). If the rotational speed of the rivet had continued at the speed sufficient to soften the top layer 42 when the rivet was being inserted, the bottom layer 44 would have been too soft to upset the rivet while flowing into the cavity 56.

Although the embodiment refers to joining magnesium alloy and aluminium, the embodiment may be used to join other materials. Although rotational speeds of 6,000 RPM then 500 RPM are referred to above, other rotational speeds may be used. The rotational speeds may be selected for a combination of materials using experimental testing.

Figure 5:
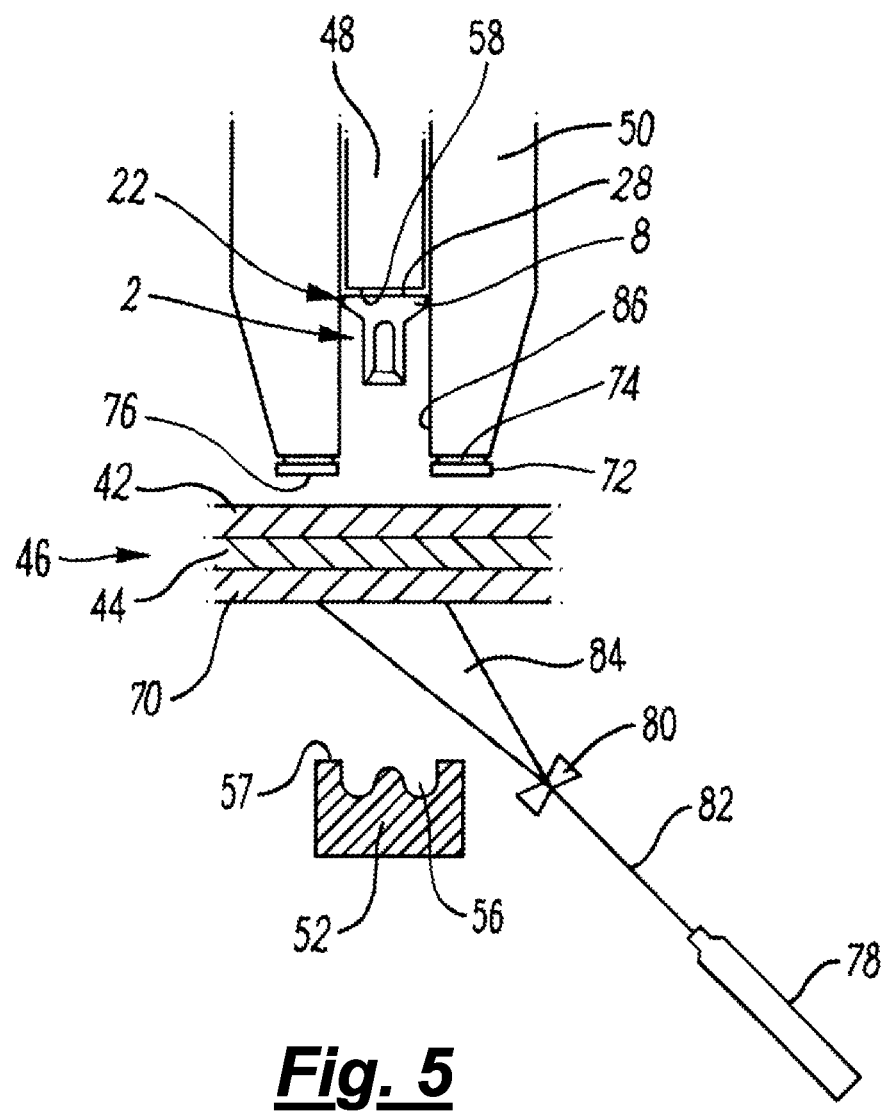
FIG. 5 is a schematic cross-sectional side view of part of the apparatus used in a method according to a second embodiment of the invention.

A method according to a second embodiment of the invention will now be described with reference to FIG. 5. The second embodiment is similar to the first embodiment, therefore only the differences will be described in detail. The second embodiment is again part of the production process for a motor vehicle (although it could be used for other products). In this case, the workpiece 46 has a first layer 42 which is part of an insulation panel made out of polymer, a second layer 44 which is part of a vehicle body work panel made of titanium alloy, and also a third layer 70 which is part of a vehicle chassis component made of standard grade steel. In this case, the first layer 42 is the top layer and the third layer 70 is the bottom layer. The rivet 2 is again of the type described in relation to FIG. 1, however in this embodiment it is made out of stainless steel. In this embodiment either the first layer 42 or the second layer 44 (but not both) may be considered to constitute a 'further layer', and the third layer 70 may be considered to constitute an 'additional layer'.

In this embodiment, the riveting tool has a clamping washer 72 which is rotatably mounted to the tool nose 50 by bearings 74. The clamping washer 72 has a pressure surface 76 which in this embodiment takes the form of an annular surface position substantially circumferentially about the longitudinal axis of the tool nose 50 (and the punch 48). In this embodiment, the workpiece 46 is held in position between the support surface 57 of the die 52 and the pressure surface 76 of the clamping washer 72, rather than directly contacting the tool nose 50 as was the case in the first embodiment. The second embodiment also includes an auxiliary heating unit in the form of a laser 78 and a lens 80 configured to spread the collimated beam 82 from the laser 78 into a divergent beam 84, as discussed below.

In this embodiment, it is the tool nose 50 rather than the punch 48 which functions as the rotary drive component. Indeed, in this embodiment the punch 48 is unable to rotate relative to the workpiece 46. When a rivet 2 is mounted in the tool nose 50 prior to insertion into a workpiece, it is inserted into a bore 86 in the tool nose 50 which is sized so as to exhibit an interference fit with the rivet (in this case with the circumferential periphery 22 of the head 8 of the rivet). The interference fit between the rivet 2 and bore 86 provides substantial frictional engagement, thereby allowing the tool nose 50 to drive the rivet 2 such that the rivet and tool nose rotate in unison. In this embodiment the bore is of complementary shape to the circumferential periphery of rivet 2 (in this case the head 8 of the rivet), however this need not be the case for a suitable interference fit to be achieved. As an alternative to an interference fit the rivet head may be provided with axial ridges or grooves which engage with complementary features provided on the bore 86.

The laser 78 is used to heat the underside of the workpiece (i.e. the third layer 70) before the die 52 and the tool nose 50 (along with the punch 48 and a rivet 2) are moved into position to form the joint. The divergent beam 84 is directed onto the portion of the third layer 70 at which the riveted joint will be formed. Energy from the laser heats the third layer 70 so as to reduce the total amount of friction stir heating which must take place (as explained below). The control unit (not visible) monitors the duration for which the laser 78 is operational, so as to indirectly monitor the temperature of the third layer 70 of the workpiece 46. When the control unit determines that the laser 78 has been operational for long enough for the third layer 70 to have reached the required temperature, the laser shuts off and the tool nose (with the punch 48 and a rivet 2) and dye 52 are positioned substantially collinearly at the portion of the workpiece 46 at which a joint is required. A rivet may be mounted to the tool nose 50 before, during or after operation of the laser (and before, during or after positioning of the tool nose).

With a rivet mounted within the tool nose 50, and the tool nose and die 52 in position, the tool nose and punch 48 (and thus also the rivet 2) are advanced axially towards the workpiece 46 supported on the die at a speed, for example, of 300 mm/s. In this embodiment, axial movement is produced by an electrical linear actuator (not visible), or a hydraulic cylinder. When the tool nose 50 has advanced sufficiently for the pressure surface 76 of the clamping washer 72 to contact the top surface of the workpiece 46, it is held against the workpiece as described above. In this embodiment, the resilient connection between the tool nose 50 and the punch 48 is configured to clamp the workpiece 46 between the clamping washer 72 and the die 52 during continued movement of the punch, rather than merely holding the workpiece 46 in position. In this case, the clamping force applied reaches 3 kN when the punch 48 has advanced within the tool nose 50 sufficiently for the rivet 2 to contact the workpiece 46. In some situations, clamping the workpiece in such a manner can improve the quality of the joint by limiting the surface area of the workpiece 46 within which the material can deform. For instance, it may help to limit the extent to which workpiece is dragged down by the rivet as (described above).

Once the rivet 2 contacts the workpiece 46, the axial movement of the punch is paused. At that point, the control unit (not visible) directs power to the motor so as to cause it to apply a torque of 2 Nm to the tool nose 50 (the control unit monitoring the torque applied to the tool nose through a suitable transducer), causing the tool nose to rotate at 4,000 RPM for example. This, in turn, causes the rivet 2 to rotate on the surface of the workpiece (at the same speed) and generate frictional heating. In addition to friction between the rivet 2 and the workpiece 46, since the punch 48 does not rotate there is significant frictional heating between the distal surface 58 of the punch and the pressure surface 28 of the rivet 2. This heats the rivet 2, and the rivet conducts some of this heat to the workpiece 46, reducing the amount of time taken to soften the workpiece material. Heating the rivet 2 also increases its ductility, allowing it to flare sufficiently when required. In contrast, in some applications without such heating the stainless steel material of the rivet may be too brittle to deform correctly (however in other applications a stainless steel rivet may have sufficient ductility at room temperature, or at the temperature reached through frictional contact with the workpiece alone).

It is noteworthy that while the tool nose 50 rotates, the clamping washer 72 does not. The bearings 74 by which the clamping washer 72 is connected to the tool nose 50 limit the torque applied to the clamping washer by the tool nose, and friction between the pressure surface 76 of the clamping washer and the workpiece 46 holds the clamping washer in a substantially rotationally static position. In contrast, if the clamping washer 72 rotated with the tool nose 50 it may burrow into the workpiece material itself, producing an unaesthetic and potentially weaker joint.

When the rivet 2 first begins to rotate, the resistance to rotation exerted on the rivet by friction between the rivet and workpiece 46, friction between the rivet and punch 48 and friction in the bearings 74 limit the rotational speed of the tool nose 50 and rivet, in this case to 2,000 RPM for example. However, as the top of the workpiece 46 is heated and softens, the frictional resistance between it and the rivet decreases. The control unit monitors the speed of the tool nose 50, and when the speed increases to a threshold value, for instance 3,000 RPM in this case, the punch 48 begins to push the rivet 2 into the workpiece 46. In this case, the control unit regulates the actuator so that the actuator exerts a force of 2 kN to the punch 48 (the control unit monitoring the force experienced by the punch and thus the rivet 2 using a force transducer such as a strain gauge) so as to move the rivet into the polymeric material of the first workpiece layer at 180 mm/s.

Once the rivet contacts the second layer 44 the frictional resistance experienced by the rivet 2 increases due to the titanium material of the second layer being significantly harder than the polymeric material of the first layer 42, and requiring a higher temperature to be softened. This increase in resistance causes the rotation of the rivet 2 and tool nose 50 to slow down. This change is detected by the control unit. In response, the control unit pauses the axial movement of the rivet and increases the torque applied by the motor to the tool nose 50 to 5 Nm, which in turn increases the rotational speed of the rivet 2, e.g. to 5,000 RPM. The rivet 2 therefore rotates on the top surface of the second layer 44, allowing time for the additional friction stir heating necessary to soften the titanium material of this layer. Once the resistance to rotation drops again, the control unit detects the associated rise in speed and begins driving the rivet 2 into the second layer 44 at an axial speed of 140 mm/s by regulating the actuator to apply an axial force of 1.5 kN.

When the rivet reaches the third layer 70, resistance to rotation of the rivet 2 (and thus the tool nose 50) increases again. At this point, however, the control unit does not change the torque with which the tool nose 50 is driven. As a result, the speed of rotation of the rivet decreases (in this case, for example, to 3,000 RPM). Since the third layer has been heated by the laser 78, however (and due to the requirement for this layer to exhibit a degree of resistance to deformation so as to upset the rivet) little or no friction stir heat input from the rivet 2 is required for the third layer 70 to be softened sufficiently for SPR. The rivet therefore continues its axial travel into the third layer 70 without pausing at its surface, and indeed the control unit increases the speed of the rivet to, for example, 150 mm/s by increasing the axial force exerted on the punch to 3 kN. During penetration of the third layer 70, workpiece material deforms into the cavity 56 of the die 52 and upsets the rivet 2 as described above.

In this embodiment, the axial speed of 180 mm/s may be considered to be a first axial speed and the axial speed of 140 mm/s a second axial speed, in which case the first axial speed is larger than the second axial speed. The terms "first axial speed" and "second axial speed" are intended to distinguish between an axial speed and a subsequent axial speed. These terms are not intended to mean that there can be no axial speed preceding the first axial speed, nor is it intended to mean that there can be no axial speed between the first axial speed and the second axial speed. Similarly, in this embodiment the rotational speed of 4,000 RPM may be considered to be a first rotational speed and the speed of 2,000 RPM or the speed of 3,000 RPM may be considered to be a second rotational speed (in which case the first rotational speed is larger than the second rotational speed). The terms "first rotational speed" and "second rotational speed" are intended to distinguish between a rotational speed and a subsequent rotational speed. These terms are not intended to mean that there can be no rotational speed preceding the first rotational speed, nor is it intended to mean that there can be no rotational speed between the first rotational speed and the second rotational speed.

Although it would be possible to soften the third layer 70 through friction stir heating alone, the rotational speed of the rivet 2 which would be required to do this effectively would have an adverse effect on the first layer 42. For example, the rivet spinning at such speeds may heat the first layer 42 too much, causing the workpiece material of this layer to melt rather than soften (at which point it could spray out under centrifugal force and leave insufficient material in the region of the joint), or catch light. This embodiment therefore reduces the rotational speed of the rivet after penetration of the second layer 44, so as to minimize the risk of any such adverse consequences, with the additional heating required by the third layer 70 being supplied by the laser 78.

Although this embodiment refers to joining a particular combination of materials, the embodiment may be used to joint other combinations of materials. Appropriate rotational speeds may be determined experimentally for different combinations of materials.

Figure 6:
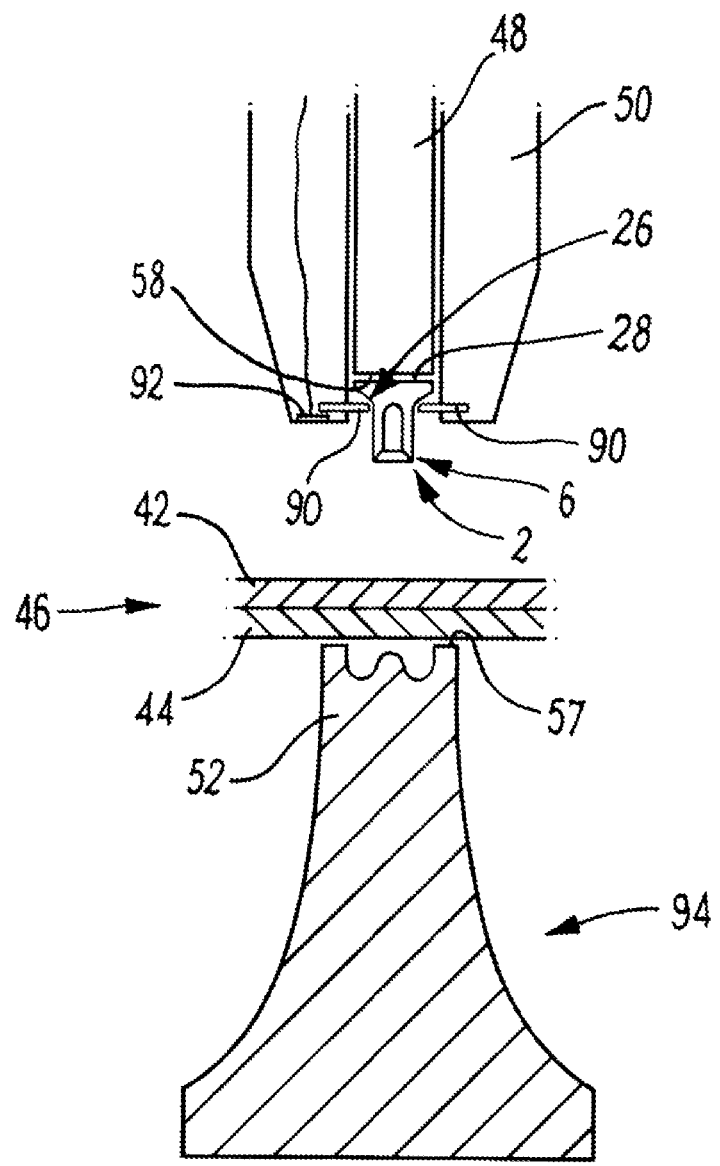
FIG. 6 is a schematic cross-sectional side view of part of the apparatus used in a method according to a third embodiment of the invention.

A method according to a third embodiment of the invention will now be described with reference to FIG. 6. The third embodiment is also similar to the first embodiment, therefore only the differences will be discussed here. In this embodiment the first layer 42 is part of a vehicle bodywork panel made out of carbon fibre composite, and the second layer 46 is part of a vehicle chassis made out of forming grade aluminium. The embodiment (like any other embodiment) may also be used for other materials and/or other products, or the rivet may be made from a different suitable material (such as stainless or non-stainless steel, magnesium, titanium or a different grade of aluminium).

In this embodiment, the tool nose 50 is a rotary drive component in engagement with the rivet 2 (e.g. due to friction or complementary axial features which engage each other). In this case, the tool nose has a substantially circumferential array of four retractable clamp jaws 90 which frictionally engage with the rivet. The jaws 90 can be moved between a closed position in which they project radially inwards so as to grip a rivet 2, and an open position in which they are retracted within the tool nose. The distal tip of tool nose 50 also has a force transducer 92, which is connected to the control unit (not visible). In this embodiment the punch 48 is freely rotatable.

To mount a rivet 2 in the tool nose 50, with the jaws 90 open, the rivet is positioned with its pressure surface 28 abutting the distal surface 58 of the punch 48 as described above. The jaws 90 are then closed, and each clamps onto a circumferential portion of the filleted intersection 26 of the rivet (shown in more detail in FIG. 1). With the clamp jaws 90 acting on this sloped surface, the rivet 2 may tend to be cammed upwards (i.e. away from the workpiece 46), however this is prevented by the contact between the pressure surface 28 of the rivet 2 and the distal surface 58 of the punch 48. As shown in FIG. 6, with the rivet 2 mounted in the tool nose 50, its tip 6 projects from the distal end of the tool nose. In this embodiment, the rivet 2 projects from the tool nose 50 by a distance substantially the same as the thickness of the first layer 42 of the workpiece 46.

The third embodiment also differs from the first embodiment in that the die 52 is part of an ultrasonic horn 94. The ultrasonic horn 94 is connectable to a source of ultrasonic energy (not visible), and acts to focus ultrasonic energy produced by that source and direct it to the workpiece 46 through the die 52. The ultrasonic horn 94 and the source of ultrasonic energy therefore co-operatively form an auxiliary heating unit. In this embodiment, auxiliary heating in the form of ultrasonic energy is applied to the workpiece 46 before and throughout the driving of the rivet 2 into the workpiece 46. The control unit monitors the duration for which ultrasonic energy has been applied to the workpiece 46, and begins to advance the punch 48 (and thus the tool nose 50 and rivet) once it has determined that the temperature of the workpiece 46 will have been increased sufficiently by the ultrasonic energy. In this embodiment, when the punch 48 (and thus the tool nose 50 and rivet 2) is advanced, it is the rivet 2 rather than the nose piece 50 which contacts the workpiece first. Indeed, since the rivet 2 projects from the tool nose 50 by a distance substantially the same as the thickness of the first layer 42 of the workpiece 46, the tool nose only contacts the workpiece once the rivet has reached the second layer 44, as described below.

As the rivet 2 is being advanced towards the workpiece 46, it is driven (by the tool nose 50 through the clamp jaws 90) to rotate at a speed of, for example, 4,000 RPM. Due to friction between the distal surface 58 of the punch 48 and the pressure surface 28 of the rivet 2, the rivet causes the punch to rotate as well. Once the rivet contacts the top of the first layer 44, this layer has been heated sufficiently by the ultrasonic energy applied through the die so that it requires relatively little friction stir heating. It is therefore unnecessary in this embodiment for the axial movement of the rivet 2 to pause on the surface of the workpiece 46. Instead, the punch 48, rivet 2 and nose piece 50 continue to advance and the rivet beings to penetrate the workpiece 46 without delay. Although the carbon fibres of this layer are not softened, the matrix within which they are held is softened, allowing the rivet to displace some fibres rather than cutting them. This reduces the extent of fraying.

When the rivet 2 reaches the second layer 44, the control unit receives feedback from the force transducer 92 which indicates that the tool nose 50 has contacted the workpiece. At that point, the control unit stops rotation of the tool nose 50, and retracts the clamp jaws 90 so as to disengage the rivet from the tool nose. The axial advance of the punch 48 continues during this time, but is slowed so that the clamp jaws 90 are not damaged by movement of the punch 48 relative to the tool nose. This also ensures that the tool nose has come to a halt before it is urged against the workpiece with any significant force, which prevents the tool nose from burrowing into the workpiece as described above. Since the rivet no longer rotating when it is driven into the second layer 46, the aluminium material is not heated to the point at which it would be too soft for the rivet to be upset. The joint is then completed and the rivet upset.

Although in this embodiment the rivet does not pause on the surface of the workpiece due to the workpiece being softened by auxiliary heating, this is not intended to suggest that only when auxiliary heating is used can the rivet advance into the workpiece without pausing. In other embodiments, for example, the rivet may have sufficient angular velocity when contacting the workpiece that friction stir softening occurs with sufficient speed that no pause in axial motion is required.

Figure 7A:
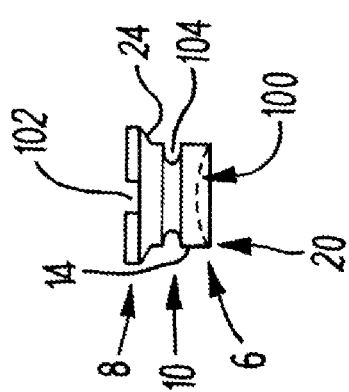
FIG. 7A is a schematic cross-sectional side of a first stage in a method according to a fourth embodiment of the invention.
Figure 7B:
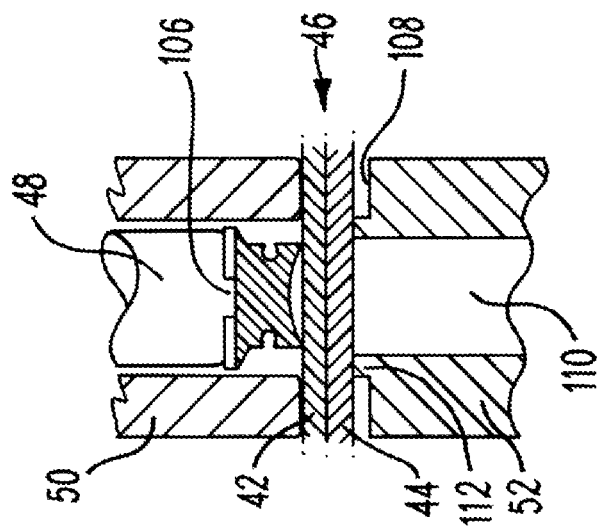
FIG. 7B is a schematic cross-sectional side view of a second stage in a method according to the fourth embodiment of the invention.
Figure 7C:
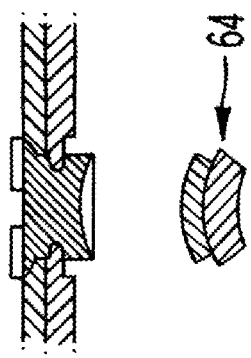
FIG. 7C is a schematic cross-sectional side view of a third stage in a method according to the fourth embodiment of the invention.

A method according to a fourth embodiment of the invention will now be described with reference to FIG. 7. This embodiment is a method of solid riveting. However, unlike conventional solid riveting where mechanical interlock between the rivet and the workpiece is provided by upsetting the rivet so as to produce enlarged portions on both sides of the rivet, in this embodiment the rivet 2 is not deformed at all. Indeed, the rivet 2 of this embodiment is made out of ceramic material, which cannot usually be deformed to any significant extent before fracture takes place. Further, in this embodiment the workpiece 46 is penetrated directly by the rivet 2, rather than the rivet being inserted into a pre-formed hole.

Like the SPR rivets described above, the rivet 2 of this embodiment has a substantially cylindrical shank 10, a tip 6 which has an annular cutting rim 20, and a head 8 with a frustoconical underside 24. In this case, however, the cutting rim 20 of the rivet 2 is provided around the perimeter of a concavity 100, rather than a bore. The rivet also has drive engagement features in the form of four substantially radial grooves 102 (one of which is visible) in the head 8, arranged in a substantially circumferential speed array at 90 degree intervals. Other arrangements of grooves or ridges may be used.

The rivet 2 also has a surface irregularity in the radially outer surface 14 of the shank 10. In this case, the surface irregularity is elongate and takes the form of a groove 104 (which is an example of an opening). The groove 104 is arranged substantially circumferentially and runs round entire circumference of the rivet shank 10. It is therefore annular in shape and provides the rivet shank 10 with a narrowed waist (that is to say a portion of reduced diameter).

The method of the fourth embodiment is a method of joining first and second layers 42, 44 of a workpiece 46, each of which is a part of vehicle bodywork panels made of forming grade aluminium (although the method could be used for other materials and/or products). The riveting tool used in this embodiment has a tool nose 50 with a punch 48 reciprocally received therein, as with SPR. In this case, however, the punch 48 has a substantially annular array of four radial ridges 106 (one of which is visible) for receipt within the radial grooves 102 of the rivet 2. In addition, the die 52 of this embodiment is a coining die. It has a flat surface 108 from which an annular lip 112 projects upwards. The lip 112 surrounds the mouth of a bore 110 through the die 52.

Unlike the previous embodiments, in this embodiment the rivet 2 is driven into the workpiece 46 at a constant rotational velocity, e.g. 6,000 RPM. Further, rather than actively controlling the linear motion of the punch 48, the control unit regulates the actuator (not visible) so that it provides a constant force, e.g. of 700N. This allows the axial movement of the rivet 2 into the workpiece to be determined by the state of the workpiece material in contact with the tip 6. The rivet 2 is rotated as it approaches the workpiece 46. When the rivet 2 contacts the workpiece 46, the aluminium material of the top layer 42 is at room temperature and is therefore insufficiently soft. The workpiece 46 therefore provides axial resistance against the rivet 2, preventing it from moving into the workpiece. The rivet 2 therefore spins on the top surface of the workpiece 46. Once the top region of the workpiece 46 has undergone sufficient friction stir softening, the amount of axial resistance it applies to the rivet 2 drops. The downward axial force on the rivet 2 begins to drive the rivet into the workpiece 46. As and when the rivet 2 contacts a portion of the workpiece 46 which is insufficiently softened its axial motion will slow or stop, providing time for the necessary frictional heating to take place.

As the rivet 2 travels into the workpiece 46, the portion of workpiece material beneath the concavity forms a slug 64 which is pushed downwards along with the rivet. When the rivet 2 has fully penetrated the workpiece 46, the slug is sheared off between the rivet tip 6 and the lip 112 of the die 52, and falls through the bore 110 for disposal. In some applications severing the slug 64 from the workpiece is desirable so as to provide a more flush finish on the underside of the workpiece (for instance for aesthetic or aerodynamic reasons). Removal of the slug 64 at this stage also prevents it from detaching subsequently, for instance after assembly of the finished product, at which point the slug 64 could cause damage to other components of the product or could remain loose within the product and rattle whenever the product is moved.

Also as the rivet 2 penetrates the workpiece 46, the lower surface of the workpiece is pressed against the lip 112 of the die 52 with sufficient force that the lip produces an annular indentation in the bottom of the workpiece. This forces workpiece material from the lower layer 44 into the groove 104, which provides an interlock between the second workpiece layer and the rivet 2. With the head 8 of the rivet preventing the first workpiece layer 43 from moving upwards relative to the rivet, and the material in the groove preventing the lower layer 44 from moving downwards relative to the rivet, the workpiece layers are held together and the join is complete.

Since insertion of solid rivets such as the type described above requires plastic deformation of the workpiece 46 so as to allow penetration by the rivet 2 and so as to provide mechanical interlock with the rivet, the considerations in terms of hardness and ductility of workpiece layers described in the first to third embodiments is also of relevance to this technology. As such, altering the speed of rotation and/or axial insertion of a solid rivet 2 may provide one or more of the benefits described in relation to SPR.

Although in this embodiment the workpiece 46 is urged against the lip 112 of the die 52 by the force from the punch 48 (through the rivet) and tool nose 50, in other embodiments it may be so urged by only the punch or only the nose piece. Further, in other embodiments the die 52 may be urged upwards for at least part of the duration of rivet insertion, instead of or as well as the workpiece 46 being urged downwards by the tool nose 50 and/or punch 48.

Figure 8:
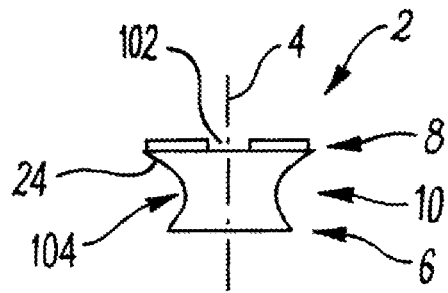
FIG. 8 is a side view of a rivet suitable for use with the invention.

FIG. 8 shows an alternative solid rivet suitable for use with the above embodiment (and suitable for use with modified versions of the above embodiment). The rivet 2 of FIG. 8 is similar to the rivet of FIG. 7, having a tip 6, a shank 10, and a head 8 with radial grooves 102. However, the rivet of FIG. 8 does not have a concavity (100 in FIG. 7). Instead, the tip 6 of the rivet 2 takes the form of a substantially circular surface positioned substantially normal to the rivet's longitudinal axis 4. In addition, the groove 104 of the rivet 2 of FIG. 8 is sufficiently wide that it extends along substantially the entire axial length of the shank 10, and intersects the underside 24 of the head 8. The greater volume of the groove 104 of the rivet 2 of FIG. 8 may allow a greater volume of workpiece material to enter it in comparison to that of the rivet of FIG. 7, potentially increasing the strength of the interlock between the workpiece layers 42, 44 and the rivet 2.

Although as described above it may be beneficial for a rivet to have an annular cutting rim (20 in FIG. 7) so as to control the behaviour of the slug 64, some riveting methods may include an active slug removal step (such as grinding of the underside of the workpiece when the joint has been formed), rendering such a feature unnecessary.

Figure 9:
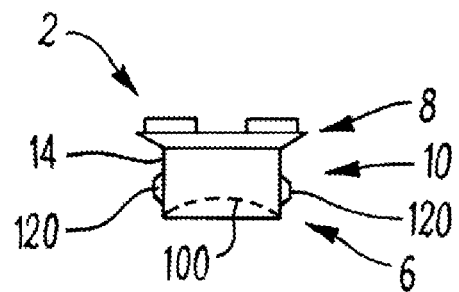
FIG. 9 is a side view of another rivet suitable for use with the invention.

FIG. 9 shows a further rivet suitable for use with the invention. This rivet 2 is similar to the rivet of FIG. 7a, with the exception that it has two surface irregularities on the radially outer surface 14 of its shank 10, each in the form of a (substantially frustoconical) radial protrusion 120. In this case, the protrusions 120 are positioned substantially circumferentially opposite to one another. The protrusions 120 may provide mechanical interlock with the workpiece 64, for instance by projecting into the lower workpiece layer 44. In addition, the protrusions may provide a stirring action as the rivet 2 is inserted into the workpiece 46 while rotating. This stirring action may act to mix softened material from the two workpiece layers 42, 44, producing an intermingled region and forming a friction stir spot weld. Such a weld may provide supplementary strength to the joint, or may be used to provide the entire connection between the workpiece layers 44, 46 (for instance if the protrusions 120 of the rivet 2 of FIG. 9 project in between the two workpiece layers 42, 44).

Although the rivet 2 of FIG. 9 has two frustoconical protrusions 120 positioned substantially circumferentially opposition one another, it is to be understood that other rivets may have a different number of protrusions, differently shaped protrusions, and/or a different number of protrusions (for example 1, 3, 4 or more). The protrusions of other rivets may be arranged in any suitable way, for instance they may be provided in a substantially circumferential annular array (whether evenly or unevenly spaced) and/or may be spaced at different axial points along the length of the rivet.

Figure 10:
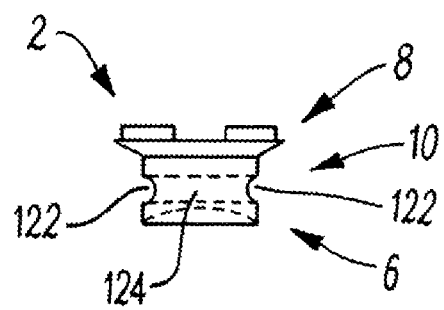
FIG. 10 is a side view of a further rivet suitable for use with the invention.

A further solid rivet 2 is shown in FIG. 10. Again, this rivet 2 is similar to that described in relation to FIG. 7. In this case, the shank 10 of this rivet 2 has surface irregularities in the form of two substantially diametrically opposite circular openings 122. Both the openings 122 are provided by a substantially diametric through-bore 124. The opening 122 may receive workpiece material during insertion of the rivet 2 (which may, for instance, be displaced by a coining die), providing the interlock between the rivet 2 and the workpiece layers 42, 44.

Like the protrusions 120 of the rivet 2 of FIG. 9, other rivets may have openings of a different number, shape or location. For example, in one modification of the rivet of FIG. 10, the openings may each be provided by a separate blind bore.

Figure 11:
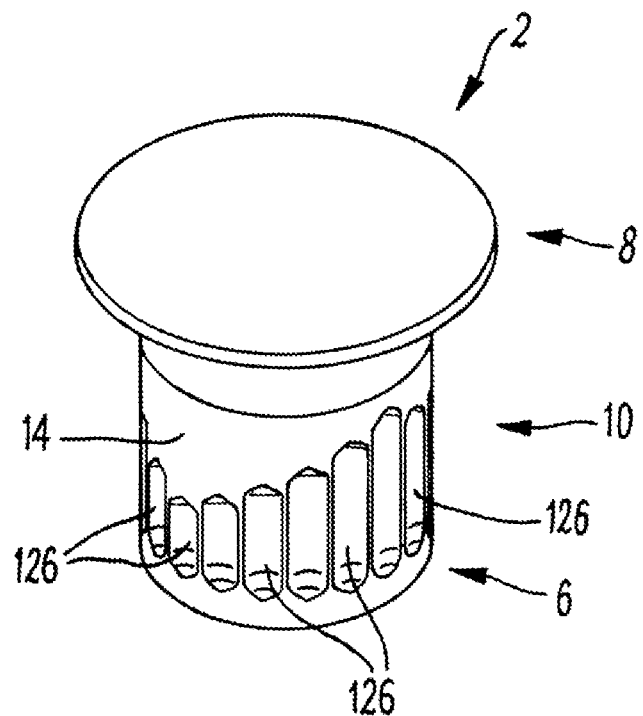
FIG. 11 is a perspective view of an additional rivet suitable for use with the invention.

FIG. 11 shows an SPR rivet suitable for use with embodiments of the invention. As with the solid rivets of FIGS. 7 to 10, the SPR rivet 2 of FIG. 11 has surface irregularities in the radially outer surface 14 of its shank. In this example, each surface irregularity is an elongate opening in the form of a groove 126. Each groove 126 is arranged substantially longitudinally on the shank 10 of the rivet 2. As will be apparent from FIG. 11, the grooves 126 are of different longitudinal lengths, and are arranged substantially evenly in a substantially circumferential array around the rivet shank 10. The grooves 126 may improve (or provide, in other embodiments where the rivet is not upset) the required interlock between the rivet 2 and the workpiece, and/or may provide the stirring action described above.

Figure 12:
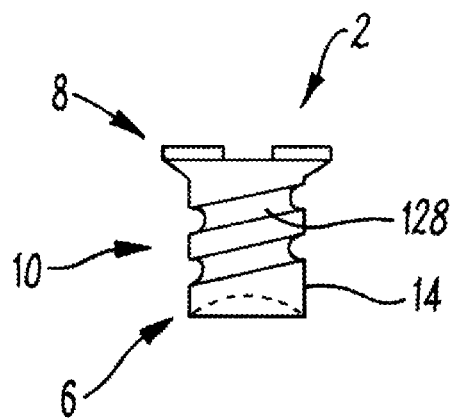
FIG. 12 is a side view of another rivet suitable for use with the invention.

A further solid rivet 2 suitable for use with embodiments of the invention is shown in FIG. 12. This rivet 2 is similar to that described in relation to FIG. 7, except that the surface irregularity in the radially outer surface 14 of the shank 10 of this rivet 2 takes the form of an elongate groove 128 which is helical in shape. This groove 128 may provide the stirring action and/or mechanical interlock described above. The helical nature of the groove 128 may also act as a screw thread during insertion of the rivet 2 into a workpiece while the rivet rotates. For example, during insertion of the rivet 2, workpiece material may be accommodated in the portion of the groove 128 nearest the tip 6 of the rivet. This workpiece material may cause the rivet 2 to be urged further into the workpiece as it continues to rotate, in a manner akin to the driving of a screw. Alternatively, helical formations such as the groove 128 may instead (or as well) act to provide a stirring action or provide mechanical interlock as discussed above. For example, the rivet 2 of FIG. 12 may be driven into a workpiece while rotating in the opposite direction to that which would allow the groove 128 to act as a screw thread).

Although in this example the rivet 2 has a single helical groove 128, other rivets may have two or more intertwined helical grooves (forming, for example, a double helix). Further, although in this example the groove 128 completes more than one full revolution of the rivet shank 10, other embodiments may have one or more grooves which are in the shape of a portion of a helix but that do not complete an entire revolution around the rivet shank. Such grooves may be considered to be in the shape of a helical arc.

FIG. 13 shows a further SPR rivet for use with the invention (FIG. 13a), components of a riveting tool used to insert the rivet 2 into a workpiece 46 (FIG. 13b), and a joint formed using this rivet and riveting tool (FIG. 13c). The rivet 2 of FIG. 13 is similar to that of FIG. 1, therefore only the differences will be described here. This rivet 2, like the rivets of FIGS. 7 to 12, has surface irregularities. In this case, the rivet 2 has four surface irregularities 140a-140d. Each surface irregularity 140a-140d takes the form of a helical rib (i.e. an elongate protrusion of helical shape). The four helical ribs 140a-140d are intertwined with one another and each end circle the shank 10 of the rivet 2, making approximately 1¼ revolutions of the rivet shank. The ribs 140a-140d may provide any of the advantages described in relation to the groove of the rivet of FIG. 12.

The rivet 2 of FIG. 13 also differs from that of FIG. 1 in that the head 8 has engagement features in the form of four substantially radial grooves 142 provided in the pressure surface 28. The grooves 142 are arranged in a substantially circumferential array at approximately 90° intervals, and each groove 142 tapers in depth towards its radially distal end. The grooves 142 co-operatively form a cross-shaped indentation in the pressure surface 28 akin to a Philips drive socket. In addition, the rivet 2 of FIG. 13 differs from that of FIG. 1 in that its internal taper surface 18 is arcuate, providing the bore 12 with a mouth that is trumpet-shaped. In other words, while the taper surface of the rivet of FIG. 1 is a chamfer, the taper surface 18 of the rivet 2 of FIG. 13 is a fillet.

As shown in FIG. 13b, the grooves 142 in the pressure surface 128 of the rivet head 8 are each engaged by complimentarily shaped and spaced ridges 144 in the distal surface 58 of the punch 48 (the ridges 144 co-operatively forming a cross-shaped projection akin to a Phillips drive bit). FIG. 13b also illustrates an SPR die 52 of slightly different geometry than that of FIGS. 4 to 6. Whilst the dies shown in these Figures have a pip 54 which is slightly recessed behind the support surface 57 of the die, in this case the pip 54 projects above that surface. Furthermore cavity 56 in the die of FIG. 13b is of reduced depth in comparison to that of the die of FIGS. 4 to 6.

FIG. 13c shows a joint produced using this rivet, and shows that interlock between the rivet 2 and workpiece 46 is not only provided by flaring of the rivet shank 10, but also by workpiece material being received between the ribs 140a-140c.

Figure 14:
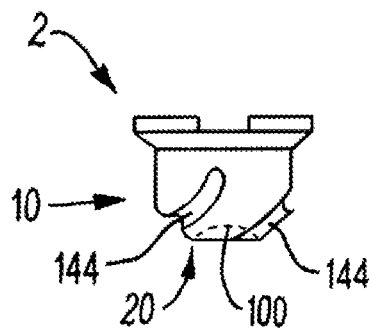
FIG. 14 is a side view of another rivet suitable for use with the invention.

FIG. 14 shows another rivet 2 suitable for use with embodiments of the invention, in this case a solid rivet. This rivet 2 is similar to the rivet of FIG. 7, apart from the fact that it has two surface irregularities, each in the form of an elongate groove 144. The grooves 144 are curved along their length, but are not arranged helically around the rivet shank 10. Instead, each groove 144 follows an asymptotic course.

Figure 15:
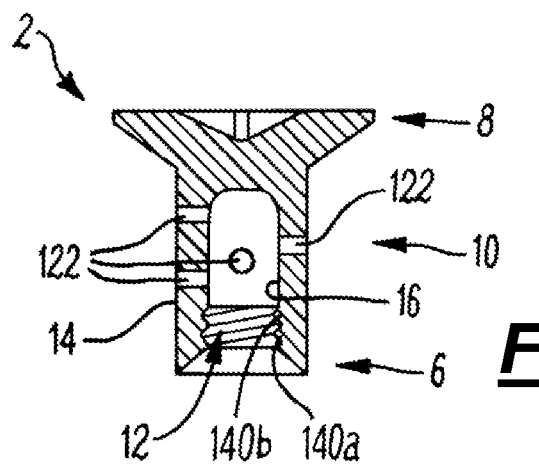
FIG. 15 is a cross-sectional side view of a further rivet suitable for use with the invention.

Whilst the rivets of FIGS. 7 to 14 have surface irregularities on the outer surfaces of their shanks, where a rivet has a bore defining a radially inner surface, the rivet may have one or more surface irregularities provided in this radially inner surface. FIG. 15 shows a modification of the rivet of FIG. 13 which includes such internal surface irregularities. More specifically, the rivet 2 of FIG. 15 has helically arranged ribs 140a, 140b, as also found in the rivet of FIG. 13. However, in this case, the ribs 140a, 140b are provided on the radially inner surface 16 of the shank 10. These helical ribs 140a, 140b may provide the functionality described in relation to the ribs of FIG. 13. The rivet 2 of FIG. 15 also has circular openings 122. These openings 122 each take the form of a substantially radial bore which passes through the radially inner and outer surfaces 16, 14 of the shank 10. Since the openings 122 intersect both the radially inner and outer surfaces 16, 14, they may be considered to be positioned both internally and externally (i.e. positioned on the inner surface and on the outer surface). In an alternative arrangement, each opening 122 may be replaced by a pair of blind bores, one in the radially outer surface 14 and one in the radially inner surface 16 (these blind bores not necessarily being aligned with one another).

Internal surface irregularities may allow a slug of workpiece material introduced into the bore 12 during insertion of a rivet 2 to be positively retained therein, minimising the possibility of slugs working loose and affecting the performance of a finished product (as described above). For example, in the rivet 2 of FIG. 15 workpiece material from the slug may fill portions of one or more of the openings 122 and/or part of the space between the internal helical ribs 140a, 140b. This would provide an interlock between the rivet 2 and the slug, so as to retain the slug.

Figure 16:
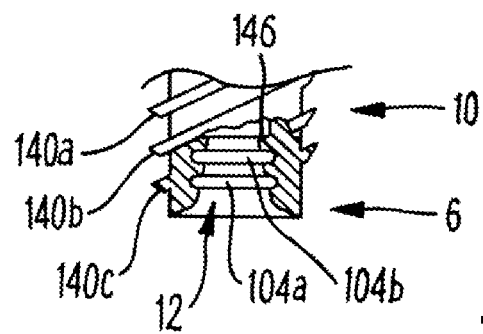
FIG. 16 is a cutaway view of part of a rivet suitable for use with the invention.

FIG. 16 shows the tip 6 and shank 10 of another SPR rivet suitable for use with embodiments of the invention. This rivet has helical ribs 140a, 140c of the type described in relation to FIG. 13, and also has internal circumferential grooves 104a, 104b. The helical ribs 140a-140c may function as described in relation to FIG. 13, and the circumferential internal grooves 104a, 104b may act to retain a slug of workpiece material as described above. The bore 12 of the rivet of FIG. 16 also has a surface irregularity in the form of a shoulder 146, which may also acts to provide interlock between the rivet and a slug of workpiece material if workpiece material in the bore 12 is deformed so as to fill the space behind the shoulder.

Figure 17:
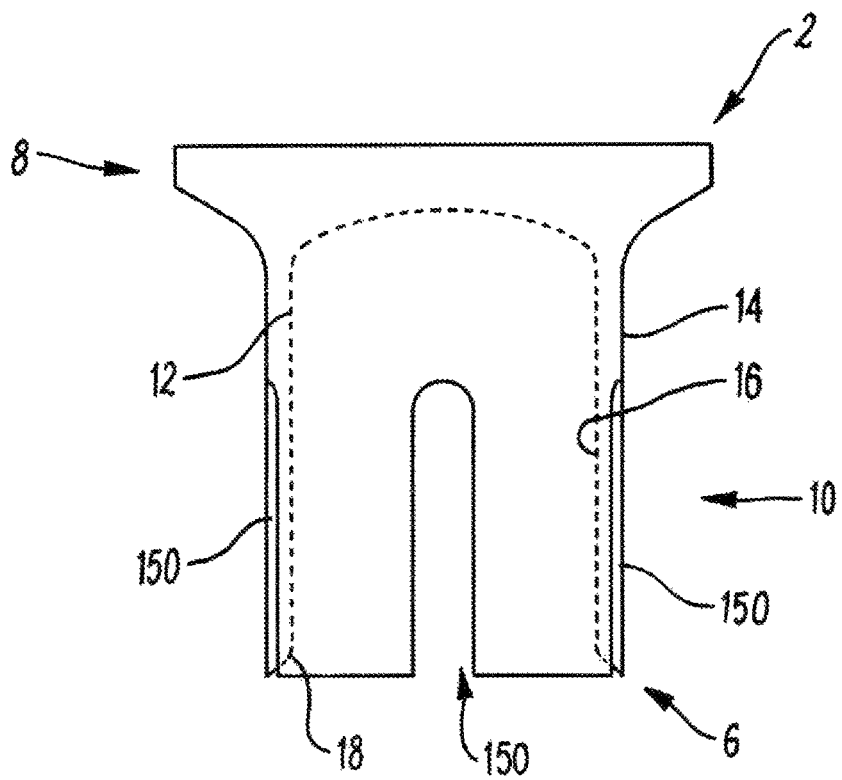
FIG. 17 is a side view of an additional rivet suitable for use with the invention.

In some applications it may be desirable for rivets to have a circumferentially discontinuous tip. A circumferentially discontinuous tip may be considered to be a tip which, in a plane normal to the longitudinal axis of the rivet, is not uniform about its circumference. An exemplary rivet with a circumferentially discontinuous tip is shown in FIG. 17. This rivet 2 is similar to that of FIG. 1, except that it has a substantially circumferential array of longitudinal slots 150. The slots 150 extend to the tip 6 of the rivet 2 and along around 70% of the axial length of the shank 10. In this case, the slots 150 intersect both the radially outer and radially inner surfaces 14, 16 of the shank 10. In other words, they extend radially through the entire thickness of the cylindrical portion of the shank 10.

The tip being circumferentially discontinuous may be beneficial in allowing the rivet tips to cut or drill its way into a workpiece rather than merely displacing workpiece material. The circumferentially discontinuous tip 6 being provided by longitudinal slots 150 which extend into a significant portion of the shank 10, may also be beneficial in that the shank is weakened circumferentially. This may reduce the amount of force which must be provided by the plastic flow of workpiece material so as to upset the rivet.

Figure 18:
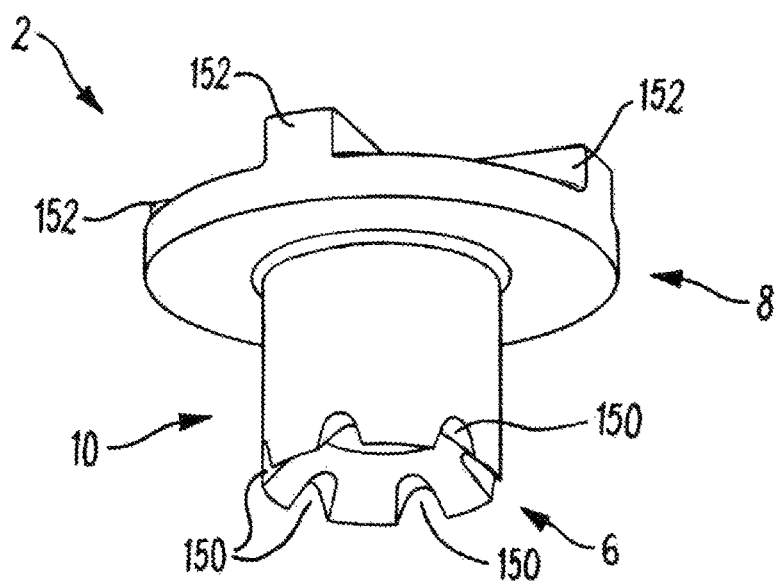
FIG. 18 is a perspective view of a rivet suitable for use with the invention.

FIG. 18 shows another SPR rivet 2 suitable for use with the invention. As with the rivet of FIG. 17, the rivet 2 of FIG. 18 has a circumferentially discontinuous tip 6 provided by slots 150. In this case, however, the slots 150 extend longitudinally a short distance into the shank 10 (e.g. less than one quarter of the length of the shank). This maintains the strength of the shank, which may allow it to pierce harder workpiece materials without flaring prematurely. The rivet 2 of FIG. 18 also has drive engagement features 152 in the form of four substantially radial ridges arranged in 90° increments. These ridges 152 are configured to be received in corresponding substantially radial grooves in a punch.

Figure 19:
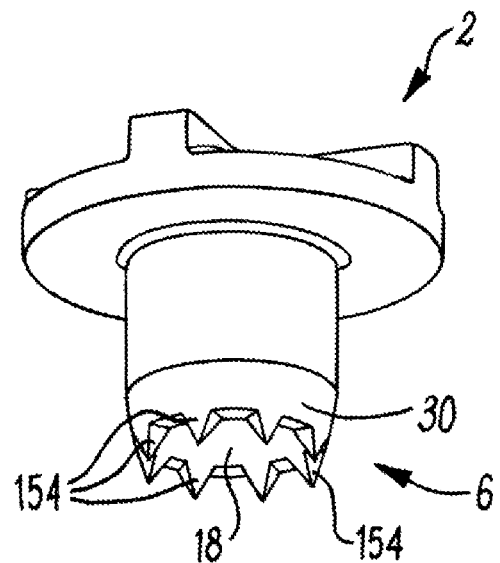
FIG. 19 is a perspective view of another rivet suitable for use with the invention.

FIG. 19 shows another SPR rivet 2 with a circumferentially discontinuous tip 6. In this case, the circumferentially discontinuous tip is provided by a substantially circumferential array of substantially evenly-spaced cutting teeth 154. This rivet 2 has an internal taper surface 18 and an external taper surface 30, giving the teeth a substantially pyramidal profile. The teeth 154 of this rivet coming to a sharp point in this manner may provide a particularly aggressive action. The teeth may, however be less resistant to deformation or wear of the tip 6 during insertion into a particularly hard material, in comparison to the rivets of FIGS. 17 and 18.

Figure 20:
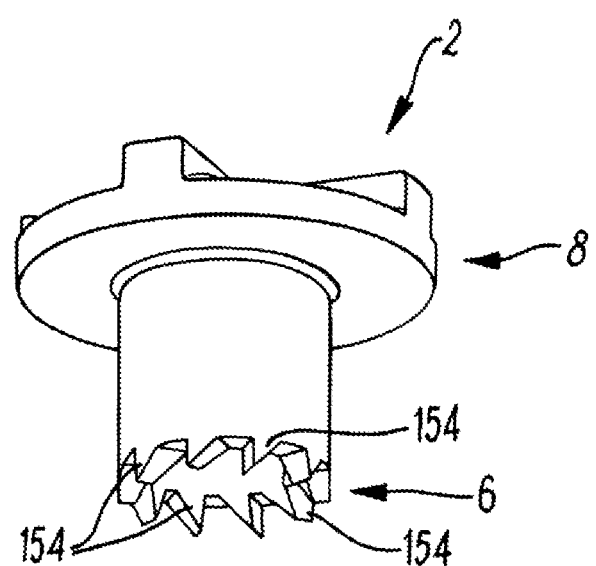
FIG. 20 is a perspective view of a further rivet suitable for use with the invention.

FIG. 20 shows another SPR rivet 2 with cutting teeth 154. The teeth 154 of this rivet have a saw-tooth profile, which may allow the aggressiveness of the cutting action to be altered according to the direction in which the rivet 2 is rotated. More particularly, the rivet would provide a more aggressive cutting action if the rivet were rotated clockwise (when viewed from the top of the head 8) than if it were rotated anticlockwise. In the case of the rivet 2 of FIG. 20, the teeth terminate in a substantially radial linear edge, rather than a point. This may make the teeth 154 more resistant to wear or deformation during insertion of the rivet, in comparison to the rivet of FIG. 19.

Figure 21:
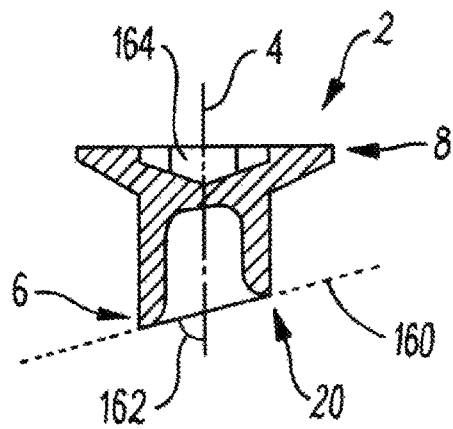
FIG. 21 is a cross-sectional side view of an additional rivet suitable for use with the invention.

Another self-piercing rivet suitable for use in the invention is shown in FIG. 21. The circumferentially discontinuous tip 6 of this rivet 2 is provided by the orientation of the cutting rim 20. More particularly, whereas in the previous rivet designs the tip defined a plane which was substantially perpendicular to the longitudinal axis of that rivet, in this case the rim 20 lies in a plane 160 positioned at an angle 162 of around 80° to the rivet longitudinal axis 4. The rivet 2 of FIG. 21 also has a different type of drive engagement feature than the rivets of FIGS. 17 to 20. In this case, the head 8 of the rivet 2 has a socket 164 of a substantially hexagonal cross-section which is configured to receive a complementarily-shaped hexagonal projection of a punch.

Figure 22:
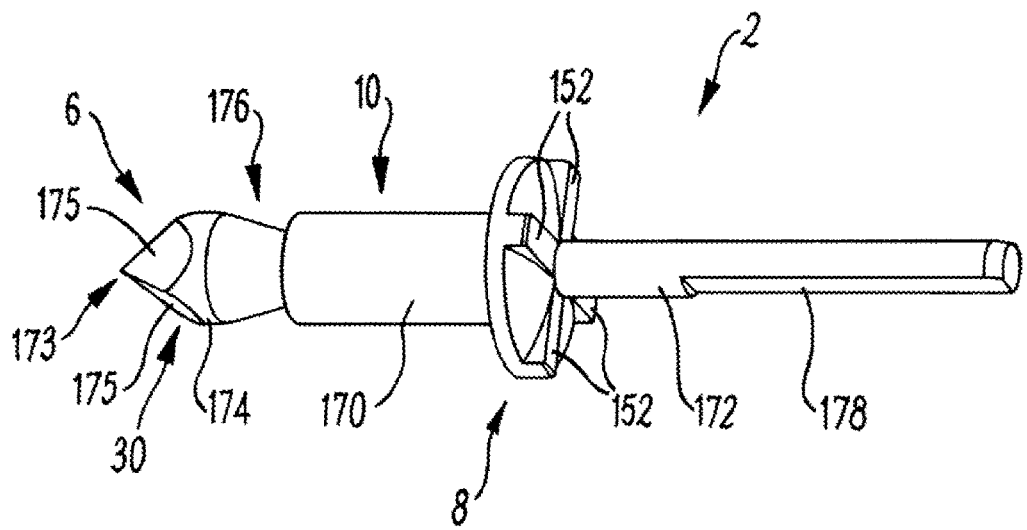
FIG. 22 is a perspective view of a rivet suitable for use with the invention.

Another rivet 2 with a circumferentially discontinuous tip 6 is illustrated in FIG. 22. In this case, the rivet 2 is a blind rivet, with a main body 170 configured to be deformed by pulling on a mandrel 172 in a manner with which the skilled person will be familiar. In this case, the circumferentially discontinuous tip 6 of the rivet 2 is provided on the bulb 174 of the mandrel 172, and the shank 10 (provided by the main body 170) is spaced therefrom by the proximal portion 176 of the bulb 174 (the portion of the mandrel 172 which upsets the main body 170). The tip 6 takes the form of a (external) taper surface 30 which tapers to a point 173 that (in this embodiment) is intersected by the longitudinal axis (not shown) of the rivet 2. The taper surface of this rivet 2 is faceted. More specifically, the taper surface 30 has four facets 175 arranged substantially in the shape of the sides of a pyramid. The rivet 2 of FIG. 22 also has a drive engagement flat 178 provided on the mandrel, for engagement by a grub screw of a rotary drive component. The head 8 of the rivet 2 is provided by the main body 170, and has radial ridges 152 of the type described in relation to FIG. 18.

Figure 23:
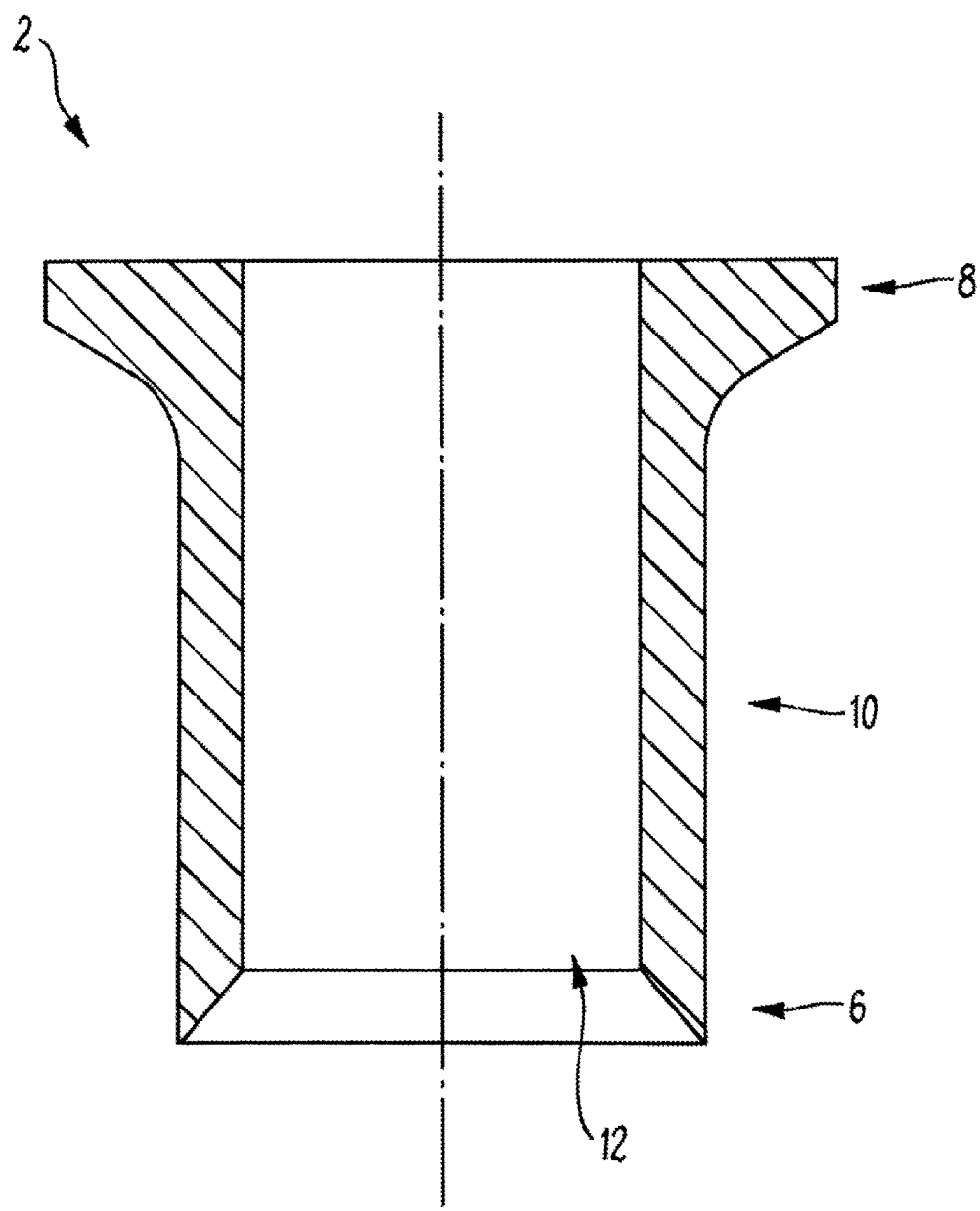
FIG. 23 is a cross-sectional side view of another rivet suitable for use with the invention.

FIG. 23 shows a further modification of the rivet of FIG. 1. In this case, the bore 12 extends throughout the entire axial length of the rivet 2. This may be beneficial in reducing the circumferential strength of the rivet (by removing any mechanical support provided by the head beyond the end of the bore), thereby allowing the shank to be upset more easily. A fully tubular rivet may also be beneficial in that space within the bore is less restricted. If the space in the bore was too small, when the bore was full additional workpiece material would be displaced downwards along with the rivet (rather than into the bore), inhibiting penetration.

Figure 24A:
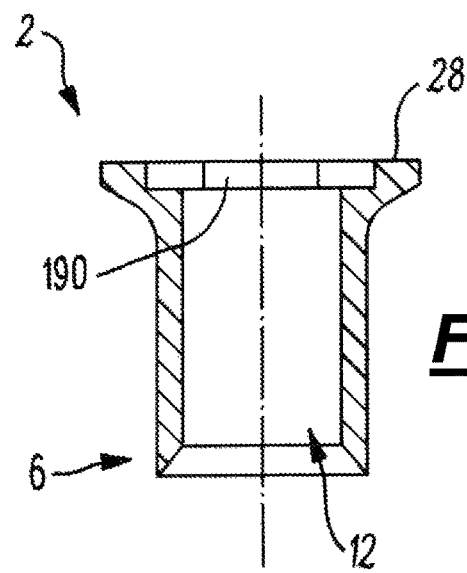
FIG. 24A is a schematic side view of a rivet suitable for use with the invention.

FIG. 24 illustrates a modification of the rivet of FIG. 23. In this case, the bore 12 includes a drive engagement portion 190, which is a portion of the bore that is non-circular in cross section.

Figure 24B:
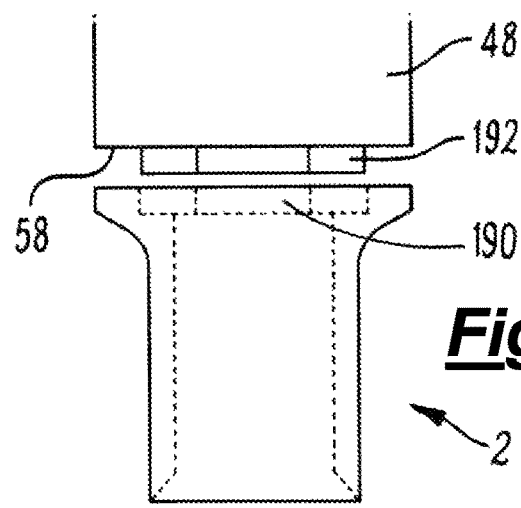
FIG. 24B is a schematic side view of a part of a tool suitable for inserting the rivet of FIG. 24A.
Figure 24C:
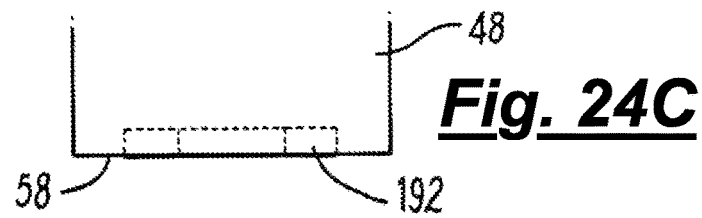

In this case the drive engagement bore portion 190 is positioned at the axial end of the bore 12 (and thus of the rivet 2) opposite to the tip 6, however in other cases it may be differently positioned. In this example, the drive engagement bore portion 190 is substantially octagonal in cross-sectional shape. The drive engagement bore portion 190 is configured to receive a driving bit in the form of a complementarily-shaped drive engagement projection 192 provided on the distal surface 58 of a punch 48. This is shown in FIG. 24B. Where is desirable for workpiece material to enter the bore 12 along substantially its entire length, for instance to avoid the resistance to insertion due to the bore being full (as described above), or so that the top of the slug in the finished joint lies substantially flush with the pressure surface 28 of the rivet, the drive engagement projection 192 of the punch 8 may be retractable. This may allow the drive engagement projection 192 to be (at least partially) withdrawn from the drive engagement bore portion 190 while the punch 48 is still in contact with the rivet 2. More particularly, the drive engagement projection 192 may be retractable to a position in which it is flush with the distal surface 58 of the punch 48, as illustrated in FIG. 24C, or may be retractable to a position in which it still projects from the distal surface 58 but does so to a reduced extent.

It is to be noted that although in FIG. 24 the drive engagement bore portion 190 is of larger diameter than the remainder or the bore 12, in other embodiments the drive engagement bore portion may be of smaller diameter, or of equal diameter but of different shape. Further, in other arrangements the drive engagement bore portion 190 may extend substantially the entire length of the bore.

Figure 25:
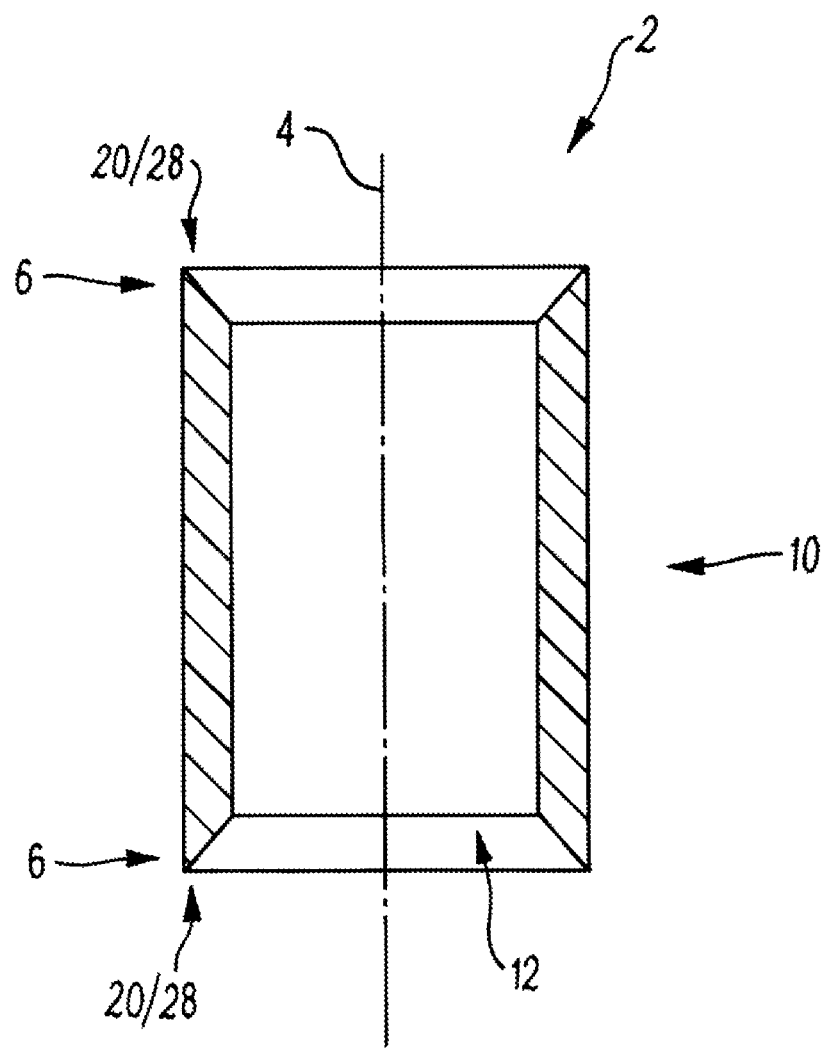
FIG. 25 is a cross-sectional side view of a further rivet suitable for use with the invention.

Another fully tubular rivet (i.e. a rivet with a bore extending along its entire axial length) is shown in FIG. 25. This rivet 2 is substantially symmetrical about its longitudinal axis 4 (that is to say that it is symmetrical in a plane which is normal to its longitudinal axis). Either axial end of the rivet 2 may be considered to be the tip 6, the rim 20 of that end being used to pierce a workpiece and the rim 20 of the other end acting as the contact surface 28 of the rivet. The rivet 2 being substantially symmetrical along its longitudinal axis 4, allowing either end of the rivet to function as the tip 6, may be beneficial in allowing the rivet to be fed to the tool nose of a riveting tool in either axial orientation. In contrast, where a rivet has a single end which is suitable for piercing a workpiece, a riveting tool may have to include an orientation mechanism to ensure that the rivet is mounted within the tool nose with the rivet tip pointing downwards. Such an orientation mechanism may add complexity and/or bulk to the riveting tool.

Figure 26A:
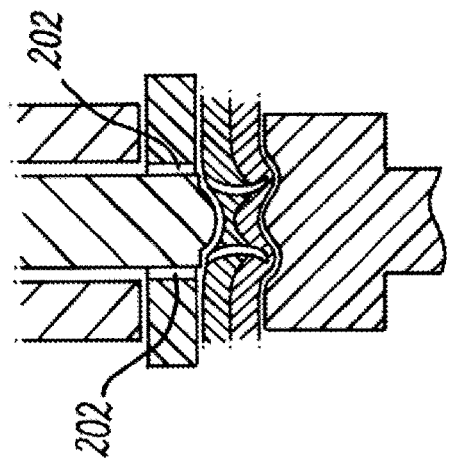
FIG. 26A is a schematic cross-sectional side view of a first stage of a method of inserting the rivet of FIG. 25 into a workpiece.
Figure 26B:
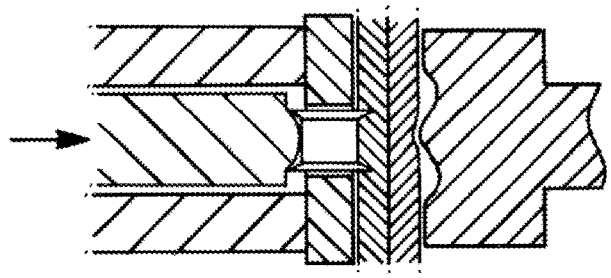
FIG. 26B is a schematic cross-sectional side view of a second stage of a method of inserting the rivet of FIG. 25 into a workpiece.
Figure 26C:
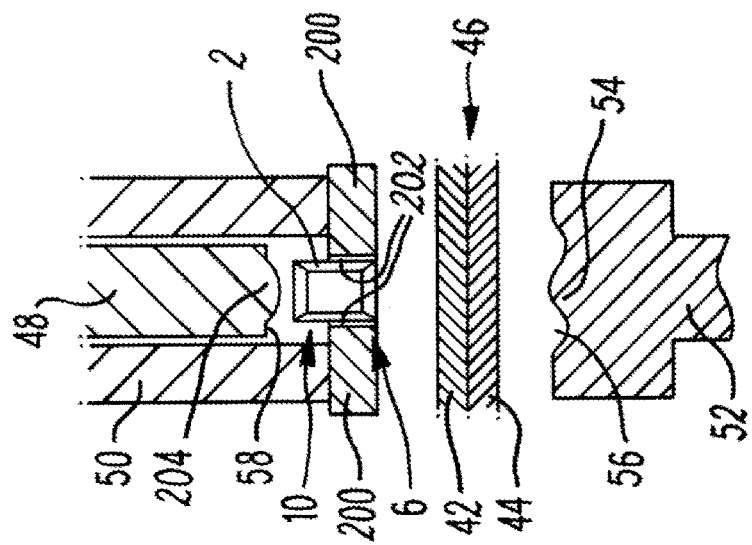
FIG. 26C is a schematic cross-sectional side view of a third stage of a method of inserting the rivet of FIG. 25 into a workpiece.

FIG. 26 illustrates a method of inserting the rivet 2 of FIG. 25 into a workpiece 46, with stages of this method shown as FIGS. 26a-26c. Like the riveting tool of the above embodiments, in this example the tool has a punch 48, a tool nose 50, and a die 52 with a pip 54 and a cavity 56.

In this case, however, the tool also has a pair of counterposed support members 200. Each support member has an arcurate indentation 202 of complimentary shape to the shank 10 of the rivet, and is arranged to receive a portion of the shank. The tool of FIG. 26 also differs from those of the above embodiments in that the punch 48 has a profiled tip. More specifically, the distal surface 58 of the punch 48 has a domed projection 204 protruding therefrom. Furthermore, although in the previous embodiments the punch 48 was substantially the same diameter as the rivet, in this case the punch 48 is significantly larger in diameter than the rivets 2.

To insert a rivet 2 into a workpiece 46, the rivet 2 is mounted between the support members 200. With the die 52 positioned against the bottom surface of the workpiece 46, and the support members 200 resting on a top surface, the rivet 2 is advanced and rotated by the punch 48 (which acts as a rotary drive component in frictional engagement with the rivet).

While the rivet is being driven into the first layer 42 of the workpiece, it is in engagement with the support members 200 so the shank 10 is radially supported and prevented from deforming outwards. When the rivet 2 reaches the second workpiece layer 44, however, the support members 200 move away from each other, disengaging their indentations 202 from the shank 10 of the rivet 2. This provides space for the punch 48 to pass between the support members 200. Further, it provides room for the upper end of the rivet 2 (i.e. the axial end of the rivet opposition the tip 6) to be flared outwards under action of the projection 204. This provides interlock between the top end of the rivet and the top end of the rivet 2 and the upper layer 42 of the workpiece 46. Simultaneously, plastic flow of workpiece material in the bottom layer 44 flares the tip 6 of the rivet as described previously. This is shown in FIG. 26c.

Although in this case two support members 200, positioned opposite to one another, are used to prevent premature layering of the rivet 2, and other embodiments may support the rivet in other ways. For example, other embodiments may use a different number of support members 200 (for example 3, 4 or more support members), and the support members may be arranged in any other suitable configuration. For instance, in another embodiment four support members may be used, the support members being positioned at a different circumferential locations around the rivet. In another modification of the embodiment of FIG. 26, the shank of the rivet may not be supported by support members at all. For example, the geometry of the rivet may be such that without support the top end of the rivet is deformed to some extent, but the rivet is still able to penetrate the workpiece 46 effectively. Where support members are used, these may be disengaged from the rivet at any other suitable time. The support members may also be of different shape. For instance, they may have a flat surface which contacts the rivet rather than having an indentation, or they may have an indentation of a different form. Support members, where present, may or may not be substantially identical to one another.

In other arrangements in which a riveting tool has a punch with a profiled tip for deforming the end of a rivet that is substantially symmetrical along its longitudinal axis, the profiled tip may include a conical or pyramidal (or frustoconical or frustopyramidal) projection protruding from a distal surface of the punch, rather than a domed projection, or the entire distal end of the punch may take such a shape. Alternatively, the punch tip may be profiled in any other suitable fashion.

Figure 27:
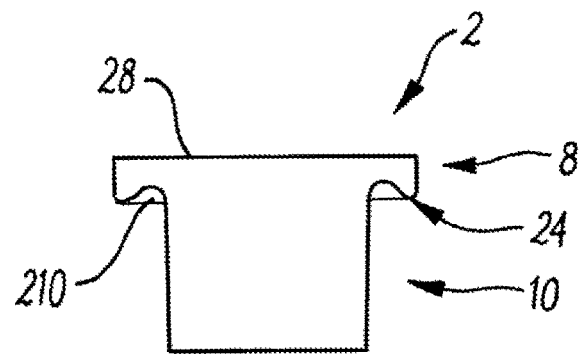
FIG. 27 is a side view of a further rivet suitable for use with the invention.
Figure 28:
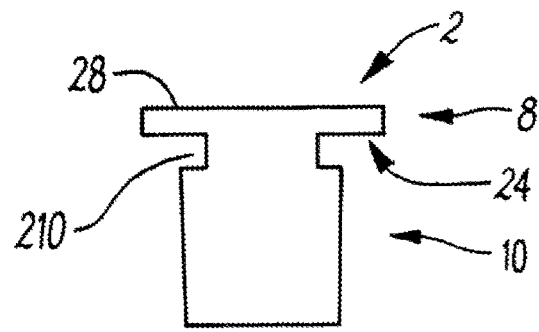
FIG. 28 is a side view of another rivet suitable for use with the invention.
Figure 29:
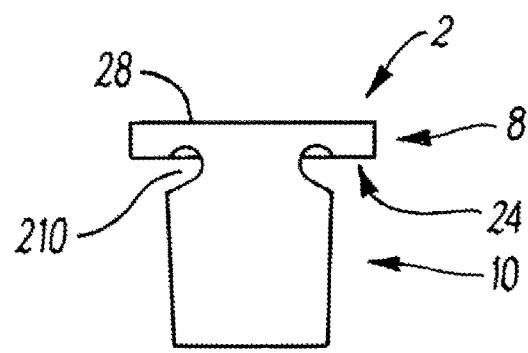
FIG. 29 is a side view of a further rivet suitable for use with the invention.

During insertion of a rivet into a workpiece, some workpiece material can be forced upwards, above the original top surface of the workpiece. In addition, where a rivet penetrates a workpiece through a cutting or drilling action, it can generate swarf. For similar reasons as the retention of workpiece slugs, as described above, in some applications it may be desirable to positively retain this material rather than provide the opportunity for it to detach at a later point. Rivets may therefore be provided with one or more cavities in the underside of their heads, or in a portion of their shanks adjacent thereto, so as to retain this material. FIGS. 27-29 illustrate three such rivets, which in this case are SPR rivets.

The rivet 2 of FIG. 27 has an annular cavity 210 provided in the underside 24 of its head 8, the rivet 2 of FIG. 28 has an annular cavity 201 positioned in the portion of the shank 10 adjacent to the underside 24 of the head 8. FIG. 29 shows a rivet 29 which has an annular cavity positioned at the junction between the underside 24 of the head 8 and the portion of the shank 10 adjacent thereto. The cavity 210 of FIG. 29 may instead be considered to be two conjoined cavities, one in the head 8 and one in the shank 10.

The cavities 210 of each of the rivets 2 are positioned substantially circumferentially. However, in other embodiments they may be positioned in any other suitable way.

Further, other rivets may include cavities for retaining workpiece material which are not annular. For instance, one such rivet may have a circumferential array of three separate cavities. The a rivet such as those shown in FIGS. 27 and 28 may be driven into a workpiece so that the underside 24 of the rivet contacts the top surface of the workpiece, which may provide more complete retention of workpiece material (since no material is displaced by the head). Alternatively, it may be driven into the workpiece so that its pressure surface 28 is substantially flush with the workpiece, which may produce a smoother surface in the region of the joint.

Figure 30:
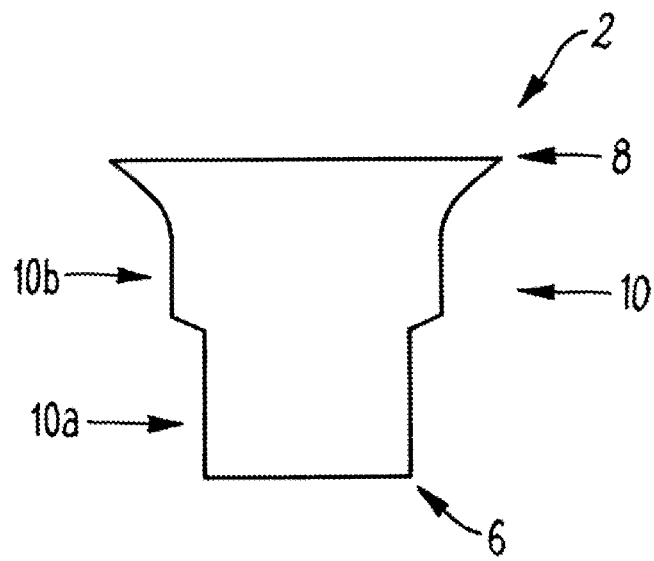
FIG. 30 is a side view of an additional rivet suitable for use with the invention.
Figure 31:
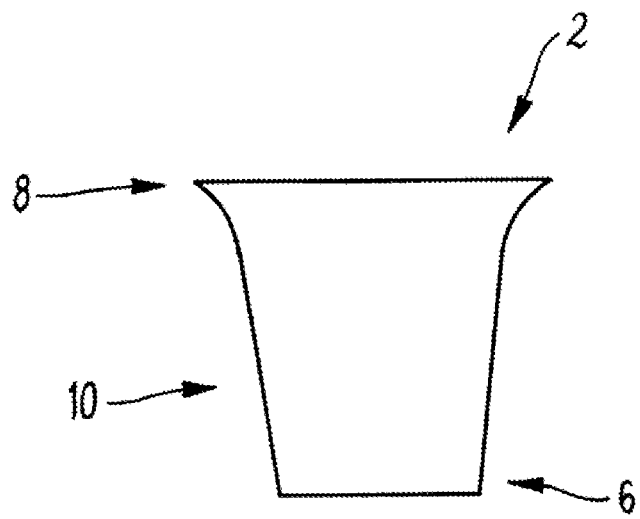
FIG. 31 is a side view of another rivet suitable for use with the invention.

In some applications, during insertion of a rivet the top layer or layers of a workpiece can leave a hole of larger diameter than the shank of a conventional rivet. For instance, where the top layers of a workpiece are significantly softer than one of the other layers, it may become over-softened (for instance it may melt) and be forced radially outwards away from the rivet by centrifugal force. This may provide a gap between the rivet and the top layers of the workpiece, which may be unaesthetic and/or provide a route for ingress of moisture. It may therefore be desirable to utilize a rivet which has a portion of its shank at its head end that is radially larger than the remainder of the shank. FIGS. 30 and 31 illustrate two such rivets. The rivet 2 of FIG. 30 has a stepped shank 10 comprising a first shank portion 10a adjacent to the tip 6, and a second shank portion 10b adjacent to the head 8. The diameter of the second shank portion 10b is larger than that of the first shank portion 10a, so that if the top layer or layers of a workpiece expands away from the rivet when penetrated by the first shank portion 10a, the enlarged hole produced can be filled by the second shank portion 10b. The rivet 2 of FIG. 31 has a shank 10 which continuously tapers from the head 8 to the tip 6. In a similar fashion to the rivet of FIG. 30, the portion of the shank 10 at the head end of the rivet can fill a hole in the top workpiece layer (s) which is larger in diameter than the portion of the shank at the tip end.

It will be appreciated that numerous modifications to the above described embodiments may be made without departing from the scope of the invention as defined by the appended claims. For instance, whilst clamping of a workpiece between a die and a tool nose has only been described in relation to a particular embodiment, it may equally be used in any other suitable embodiment. In addition, whilst auxiliary heating of a workpiece has been described as being supplementary to friction stir heating, in other embodiments a rivet may be driven into a workpiece at insufficient rotational velocity to bring about any significant friction stir heating, at which point substantially all the increase in temperature of a workpiece necessary to soften the workpiece material may be brought about by auxiliary heating. In any embodiment of the invention, auxiliary heating (where present) may take any suitable form, such as the application of ultrasonic energy, the use of laser, the use of electromagnetic induction, or the use of a radiative or convective heating element such as a heating coil or a gas burner. Further, auxiliary heating of more than one type may be utilised (either at different times or simultaneously) in a single embodiment.

In any embodiment of the invention which utilises a die and a punch and/or tool nose, the die and the punch and/or tool nose may be mounted opposite one another on a force reaction frame such as a C-frame.

Although some embodiments of the invention relate to SPR riveting and others to solid riveting, it is to be understood that one or more features described in relation to SPR may also be present in relation to solid riveting, and vice versa. Similarly, the insertion of a blind rivet may also utilise friction stir softening with an alteration in the rotational speed and/or axial speed of insertion of the rivet, therefore one or more of the aspects of the invention (and any appropriate optional features) may be embodied by a blind riveting process. In this case, the method would further comprise moving the mandrel of a blind rivet inserted into a workpiece relative to the main body of that blind rivet to upset the rivet. The anatomy of a blind rivet, and the upsetting of that blind rivet (after insertion into a workpiece using a method according to the invention) would be readily apparent to the skilled person.

Whilst specific types of auxiliary heating, namely the use of a laser and the use of ultrasonic energy, have been described in relation to particular embodiments, these types of auxiliary heating (or any other) may be utilised in relation to any embodiment of any aspect of the invention.

Although embodiments described above relate to the manufacture of a motor vehicle, embodiments of the invention may be used in the manufacture of any other suitable products. Such products include industrial machinery, air conditioning systems, road signs, mechanical support structures, water tanks and grain silos.

In any embodiment of the invention where the rivet has a bore, the bore may be a blind bore or a through bore. It may be substantially circular in cross section, or may have any other suitable cross sectional shape. The bore may be parallel with longitudinal axis of the rivet, for instance it may be collinear therewith. The bore may or may not change in diameter and/or in cross sectional shape along its length.

Although the second and third embodiments of the invention (i.e. those in which the tool nose functions as the rotary drive component) describe the tool nose engaging the rivet frictionally and about its circumferential periphery, in other embodiments the tool nose may engage a different portion of the rivet and/or may not engage the rivet through friction. Similarly, the rivet may engaged about its periphery non-frictionally, and/or by a component of the riveting tool other than the tool nose. By way of an illustration, the rivet may have a non-circular head (for instance an octagonal head), and be received within a complimentarily-shaped bore (for instance an octagonal bore, or a square bore) in the nose piece. In this case, the rivet would be engaged by the tool nose non-frictionally. As another illustration, the rivet may have a head which is non-circular in cross section and which is received within a complimentarily-shaped socket in the punch (for instance the rivet head may be pentagonal and received in a pentagonal socket in the punch). In this case, the rivet would be engaged about its circumferential periphery, but would be engaged non-frictionally and would not be engaged by the tool nose.

It is to be understood that reference herein to a metal is intended to include alloys of that metal. Although in the second embodiment the pressure surface of the riveting tool (provided on the clamping washer, in that example) is freely rotatable relative to the tool nose due to it being mounted thereto by bearings, in other embodiments the pressure surface may be coupled to the tool nose in an alternative manner in which the relative rotation between the pressure surface and the tool nose is restricted. This may be advantageous in that the pressure surface may be urged to rotate on the surface of the workpiece to some extent, thereby generating frictional heat.

Whilst support members have been described in relation to supporting a rivet which is substantially symmetrical along its longitudinal axis, they may be utilised in other embodiments. For instance, they may support a rivet which is fully tubular but which has a head portion, so as to compensate for the reduced strength described above (or in cases where the rivet is deformed at the head end by a profiled punch to as to increase the radius of the head). Further, they may be used to support any other type of rivet. For instance, a relatively soft rivet may be used (for example for the sake of corrosion resistance), the reduced column strength of that rivet being compensated for by support from the support members.

In relation to solid riveting, although the solid rivets described above each comprise a radially enlarged head, in other embodiments a solid rivet may not comprise such a head. In this case, the mechanical interlock between the rivet and the workpiece layers may be brought about entirely by deformation of workpiece material into or around surface irregularities (for instance the rivet may have two grooves, one of which receiving material from the top workpiece layer and the other receiving material from the bottom workpiece layer).

Although dies of particular formats have been described in the above embodiments, other embodiments of the invention may utilise a die of a different form. For example, an embodiment may utilise a die which comprises a flat surface, a die which has a recess with no pip, a die which has a pip with no recess, a die with a convex support service or a die of any other suitable shape. Further, in some embodiments in the invention (for instance those which utilise a blind rivet) no die may be used.

In some embodiments, a die of a particular shape may be utilised in a number of different riveting processes (for instance the joining of workpieces of different thicknesses) comprising different materials, or utilizing different rivets). By way of an illustration, rivets of 10 mm axial length may be used in combination with the same die to join workpieces of total thickness 8 mm or 12 mm. In the case of a 12 mm thickness workpiece, the pip of the die may still be able to direct the plastic flow of workpiece material sufficiently to fully upset the rivet, even though the workpiece material may not enter the cavity of the die to its full depth the rivet itself would not enter the cavity. In the case of an 8 mm thick workpiece the workpiece material may enter the cavity to an increased depth, allowing the tip of the rivet to enter the cavity while remaining fully encapsulated.

Although SPR has been described in relation to the rivet being upset into the bottom layer of a workpiece, thereby being encapsulated within the workpiece, in another form of riveting the rivet may fully penetrate the workpiece. For example, the rivet may fully penetrate the workpiece without being deformed to any significant extent, before being upset by a die so as to flare the distal portion of the shank underneath the lower surface of the workpiece. This may be useful when riveting workpieces where the bottom layer is of insufficient ductility for the rivet to be upset therein.

Whilst the above embodiments describe examples of ways in which a riveting process may be monitored, any embodiment may utilise any suitable arrangement for collecting information. For example, the rotational and/or linear position or speed of the rivet (or a component of the riveting tool) may be monitored by a control unit using one or more positional encoders such as optical (e.g. laser), magnetic, inductive, capacitive or eddy current encoders. Similarly, although temperature sensors and force (or torque) transducers have each been described above in relation to a particular location and in connection with numerous other features, one or more such transducers (or a transducer of any other type) may be included in any suitable position (such as in the nose of the tool, the punch, or the die) and may be used in any suitable embodiment of any aspect of the invention. Similarly, the duration of a particular action (such as the time for which a rivet has been moved axially or rotationally, or the duration for which auxiliary heating has been applied) may be monitored in any embodiment of the invention and used to determine when a subsequent action should be initiated. Alternatively, embodiments of the invention may not collect feedback of any sort. For instance the rivet may be inserted using a riveting tool the actions of which are controlled entirely by an operator.

Although the above embodiments describe the rivet being moved axially into a stationary workpiece, in other embodiments the workpiece may be moved along the longitudinal axis of the rivet into a stationary rivet, or both the rivet and workpiece may be moved together. Accordingly, reference herein to the speed of a rivet (whether rotational or axial) should be interpreted as referring to the speed of the rivet relative to the workpiece.

Whilst the above embodiments describe particular combinations of numbers of workpiece layers, workpiece layer materials, rivet materials, axial speeds (and alterations thereof) and rotational speeds (and alterations thereof), this is not intended to imply that these selections are only suitable for use in the combinations described. Any suitable combination of numbers of workpiece layers, workpiece layer materials, rivet materials, axial speeds (and alterations thereof) and rotational speeds (and alterations thereof) are contemplated.

In any embodiment of the invention in which the axial speed of the rivet is adjusted, the rotational speed of the rivet may be constant throughout insertion. Similarly, where the rotational speed of the rivet is adjusted, the axial speed of the rivet may be constant throughout insertion.

Although particular embodiments described above utilise a hydraulic motor or an electric motor to rotate the rivet, any embodiment of the invention may use any suitable arrangement to rotate the rivet. For example, an embodiment may utilise an electric motor (such as an induction motor, a synchronous motor or a DC motor) a hydraulic motor or a pneumatic motor. Similarly, although the above embodiments describe use of a hydraulic cylinder or an electric linear actuator to drive the rivet axially, any embodiment of the invention may utilise any suitable form of actuator, such as a solenoid, hydraulic cylinder, pneumatic cylinder, or electric linear actuator.

In an embodiment of the invention where the rivet includes one or more surface irregularities, these may be sized and/or positioned to correspond with the location of one or more specific workpiece layers.

Although the description above refers to a longitudinal slotted shank and an array of teeth as being alternatives, it is to be understood that a rivet may incorporate both of these features. For example, a rivet may have longitudinal slots which provide circumferential portions therebetween, each circumferential portion having one or more teeth. As another alternative, longitudinal slots may provide circumferential portions each of which are tapered towards their distal tip so as to provide an integral tooth.

Where a rivet has substantially longitudinal slots in a substantially tubular portion of its shank, the slots may or may not run the full axial length of the tubular portion, and where the slots do run the full axial length of the tubular portion they may or may not run the full axial length of the entire shank. Although in the above example the slots are of uniform longitudinal width and uniform radial depth, in other embodiments this may not be the case. For instance, the circumferential width of the slots may increase or decrease (uniformly or non-uniformly) towards the tip. Alternatively or in addition, the radial depth of the slots may increase or decrease (uniformly or non-uniformly) towards the tip. In the described example the slots are substantially identical and are arranged substantially uniformly, however in other embodiments the slots may differ from one another (for example in longitudinal length, circumferential width or radial depth) and/or be differently arranged.

In situations where a slug of workpiece material is at risk of detaching from a finished joint after assembly of a finished product, a rivet may be provide with a quantity of adhesive (for instance in the bore of an SPR rivet or the concavity of a solid rivet) which may adhere the slug to the rivet and reduce the likelihood of the slug detaching. This may be used in combination with one or more of the above described ways in which the slug can be retained, or may be used in isolation.

Whilst workpiece layers of a range of materials have been described, the selected range of materials should be considered to be merely examples. In an embodiment of the invention a workpiece may contain one or more layers of any suitable material, such as magnesium, aircraft grade aluminium, ultra-high strength steel, titanium or metal matrix composite. Alternatively or in addition, the workpiece may comprise one or more layers of carbon fibre composite, glass fibre composite, polymer, a metal such as standard grade steel (stainless or non-stainless) or forming grade aluminium, an organic material such as leather, or any other suitable material.

For the sake of simplicity, changes to the motion of the rivet, and deformation of the rivet (where applicable) have been described as occurring layer-by-layer in stepwise fashion. However, it is to be understood that in reality deformation of the rivet and/or alterations in its rotary and/or linear speed may not occur in this manner. As an example, events described as taking place suddenly when the rivet contacts a workpiece layer of harder material may in fact take place in a gradual fashion as the rivet contacts workpiece material which gradually is colder (and therefore harder), whether or not this colder material is part of a newly-contacted workpiece layer. Accordingly, the motion of the rivet may be controlled according to the forces it experiences (such as resistive forces) rather than its position relative to the layers of a workpiece.

Although the different aspects of the invention have been described individually or particular combinations, it is to be understood that each aspect of the invention may be utilised individually or in combination with any other aspect or aspects of the invention where appropriate. For example, although the rivet being engaged about its circumferential periphery (the seventh aspect of the invention) has been described in combination with the application of auxiliary heating (the eleventh aspect of the invention), a method according to the invention may utilise only one of these concepts. As another example, a rivet may have a bore that extends along its entire axial length (in accordance with the eighth aspect of the invention) and a cavity provided in the underside of its head (in accordance with the ninth aspect of the invention), and be driven to rotate by the nose of a tool (in accordance with the eighth aspect of the invention). Indeed, a rivet with both an enlarged shank portion at the head and a cavity to receive workpiece material may be beneficial in that the enlarged shank portion can be deliberately oversized. This may ensure that the rivet can fill a hole in the top portion of the workpiece of any size which may reasonably be expected, with the cavity receiving workpiece material displaced by the enlarged shank portion in the event that the hole in the top of the workpiece is of smaller diameter.

Further, although specific features or arrangements have been described in relation to one aspect of the invention, some may equally be considered as relating to a different aspect of the invention. For instance, the rivet of FIG. 14 has been described in terms of the grooves being surface irregularities (i.e. it has been described in relation to the first aspect of the invention). However, these grooves also provide the rivet with a circumferentially discontinuous tip (albeit one which is not circumferentially discontinuous across its entire radial extent), therefore this rivet may also be considered to relate to the second aspect of the invention. As another example, the rivet of FIG. 17 has been described in terms of the slots providing a circumferentially discontinuous tip (i.e. it has been described in relation to the second aspect of the invention), the slots also constitute surface irregularities in the form of openings therefore this rivet may also be considered to relate to the first aspect of the invention.

Optional and/or preferred features as set out herein may be used either individually or in combination with each other where appropriate and particularly in the combinations as set out in the accompanying claims. The optional and/or preferred features for each aspect of the invention are also applicable to any other aspects of the invention where appropriate.

The invention claimed is:

1. A method of inserting a rivet into a workpiece, the method comprising:
    moving the rivet and workpiece relative to one another, along a longitudinal axis of the rivet, so as to drive the rivet into the workpiece;
    rotating the rivet about a longitudinal axis of the rivet, relative to the workpiece, for at least part of a time during which the rivet is in contact with the workpiece; and
    altering a speed of rotation, or a speed of movement of the rivet along the longitudinal axis of the rivet, at least once before driving of the rivet into the workpiece is complete,
    wherein one axial end of a body of the rivet has a tip for piercing the workpiece, the rivet has a substantially cylindrical shank extending longitudinally from the tip, and the shank has one or more surface irregularities, and
    wherein after driving the rivet into the workpiece is complete, the body of the rivet abuts the workpiece.

2. The method according to claim 1 wherein one or more of said surface irregularities are provided on a radially outer shank surface.

3. The method according to claim 1 wherein the rivet has a bore which runs through the tip and through at least a portion of the shank, thereby providing a radially inner shank surface, and one or more of said surface irregularities are provided on the radially inner shank surface.

4. The method according to claim 1 wherein one or more of said surface irregularities are elongate in shape.

5. The method according to claim 4 wherein one or more of said elongate surface irregularities are aligned substantially parallel to the longitudinal axis of the rivet.

6. The method according to claim 4 wherein one or more of said elongate surface irregularities are aligned substantially circumferentially to the shank.

7. The method according to claim 4 wherein one or more of said elongate surface irregularities are each substantially in the shape of a helical arc.

8. The method according to claim 1 wherein one or more of said surface irregularities each take the form of a projection.

9. The method according to claim 1 wherein one or more of said surface irregularities each take the form of an opening.

10. The method of claim 1, wherein the speed of rotation, or the speed of movement along the longitudinal axis of the rivet, is altered by a predetermined amount.

11. The method of claim 10, wherein the predetermined amount is dependent upon the workpiece.

12. A method of inserting a rivet into a workpiece, the method comprising:
 moving the rivet and workpiece relative to one another, along a longitudinal axis of the rivet, so as to drive the rivet into the workpiece;
 rotating the rivet about a longitudinal axis of the rivet, relative to the workpiece, for at least part of a time during which the rivet is in contact with the workpiece; and
 altering a speed of rotation, or a speed of movement of the rivet along the longitudinal axis of the rivet, at least once before driving of the rivet into the workpiece is complete,
 wherein one axial end of a body of the rivet has a circumferentially discontinuous tip for piercing the workpiece, and the rivet has a substantially cylindrical shank which extends longitudinally from the tip and provides a radially outer shank surface, and
 wherein at least a portion of the body of the rivet flares whilst the rivet is driven into the workpiece.

13. The method according to claim 12 wherein the circumferentially discontinuous tip comprises a plurality of teeth.

14. The method according to claim 12 wherein the rivet has a bore which runs through the tip and through at least a portion of the shank, thereby providing a substantially tubular shank portion with a radially inner shank surface.

15. The method according to claim 14 wherein the tip is provided by substantially longitudinal slots in the substantially tubular portion.

16. The method according to claim 15, wherein the tip is circumferentially discontinuous across the entire circumferential extent of the tip and wherein the slots extend between the radially inner shank surface and the radially outer shank surface.

17. The method according to claim 12 wherein the tip has an external taper surface which intersects the radially outer shank surface.

18. A method of inserting a rivet into a workpiece using a riveting tool, the method comprising:
 moving the rivet and workpiece relative to one another, along a longitudinal axis of the rivet, so as to drive the rivet into the workpiece, wherein the riveting tool comprises a tool nose and a punch reciprocally disposed therein, and wherein the punch provides axial force to the rivet so as to drive a tip of a body of the rivet into the workpiece;
 rotating the rivet about a longitudinal axis of the rivet, relative to the workpiece, by the nose of the riveting tool for at least part of a time during which the rivet is in contact with the workpiece; and
 altering a speed of rotation, or a speed of movement of the rivet along the longitudinal axis of the rivet, at least once before driving of the rivet into the workpiece is complete, and
 wherein after driving the rivet into the workpiece is complete, the body of the rivet abuts the workpiece.

19. The method according to claim 18 wherein the punch rotates relative to the workpiece during driving of the rivet into the workpiece.

20. The method according to claim 18 wherein the punch does not rotate relative to the workpiece during driving of the rivet into the workpiece.

21. A method of inserting a rivet into a workpiece, the method comprising:
 moving the rivet and workpiece relative to one another, along a longitudinal axis of the rivet, so as to drive a tip of a body of the rivet into the workpiece;
 rotating the rivet about a longitudinal axis of the rivet, relative to the workpiece, for at least part of a time during which the rivet is in contact with the workpiece; and
 altering a speed of rotation, or a speed of movement of the rivet along the longitudinal axis of the rivet, at least once before driving of the rivet into the workpiece is complete, and
 wherein the rivet has a longitudinal bore which extends along the entire axial length of the rivet, and
 wherein at least a portion of the body of the rivet flares whilst the rivet is driven into the workpiece.

22. The method according to claim 21 wherein the rivet is rotated by a rotary drive component of a riveting tool, the rotary drive component engaging with a section of the bore which has a non-circular cross section.

23. The method according to claim 22 wherein the rotary drive component is a punch which provides axial force to the rivet so as to drive the rivet into the workpiece, the punch engaging with said section of the bore through a complementarily-shaped driving bit projecting therefrom.

24. The method according to claim 23 wherein the driving bit is movable between an extended position in which the driving bit projects from a distal surface of the punch, to a retracted position in which the driving bit projects from said distal surface of the punch to a reduced extent or is flush with said distal surface of the punch.

25. The method according to claim 23 wherein punch has profiled tip which applies said axial force to one axial end of the rivet, and deforms that end of the rivet during driving of the rivet into the workpiece.

26. A method of inserting a rivet into a workpiece, the method comprising;
 moving the rivet and workpiece relative to one another, along a longitudinal axis of the rivet, so as to drive the rivet into the workpiece;
 rotating the rivet about a longitudinal axis of the rivet, relative to the workpiece, for at least part of the time during which the rivet is in contact with the workpiece;
 altering a speed of rotation, or a speed of movement of the rivet along the longitudinal axis of the rivet, at least once before driving of the rivet into the workpiece is complete,
 wherein a body of the rivet has a tip for piercing the workpiece at one axial end, a shank extending longitudinally from the tip, and a head extending radially outwards from the shank,
 wherein the head defines an underside which faces towards the tip,
 wherein the rivet has a cavity provided in the underside of the head, or in a portion of the shank adjacent thereto, within which workpiece material may be accommodated, wherein at least a portion of the body of the rivet flares whilst the rivet is driven into the workpiece, and wherein after driving the rivet into the workpiece is complete, the body of the rivet abuts the workpiece.

27. A method of inserting a rivet into a workpiece, the method comprising:

moving the rivet and workpiece relative to one another, along a longitudinal axis of the rivet, so as to drive a tip of a body of the rivet into the workpiece;

rotating the rivet about a longitudinal axis of the rivet, relative to the workpiece, for at least part of a time during which the rivet is in contact with the workpiece;

altering a speed of rotation, or a speed of movement along the longitudinal axis of the rivet, at least once before driving of the rivet into the workpiece is complete; and applying auxiliary heating to at least one of (i) the workpiece and (ii) the rivet, at at least one point before, during or after driving of the rivet into the workpiece, wherein at least a portion of the body of the rivet flares whilst the rivet is driven into the workpiece, and wherein after driving the rivet into the workpiece is complete, the body of the rivet abuts the workpiece.

28. The method according to claim 27 wherein the rivet penetrates at least a portion of the workpiece with a rotational speed of substantially zero.

29. The method according to claim 27 wherein the or at least one of the alterations in axial or rotational speed of the rivet are brought about by resistive forces applied to the rivet by the workpiece.

30. The method according to claim 27 wherein the or at least one of the alterations in axial speed of the rivet are brought about by an alteration in the magnitude of axial force applied to the rivet or workpiece so as to drive the rivet into the workpiece.

31. The method according to claim 27 wherein the axial movement of the rivet relative to the workpiece is paused at at least one point before driving of the rivet into the workpiece is complete.

32. The method according to claim 27 wherein the axial movement of the rivet relative to the workpiece is paused when the rivet first contacts the workpiece.

* * * * *